United States Patent
Faulkner et al.

(10) Patent No.: US 11,310,294 B2
(45) Date of Patent: Apr. 19, 2022

(54) COMPANION DEVICES FOR REAL-TIME COLLABORATION IN COMMUNICATION SESSIONS

(71) Applicant: Microsoft Technology Licensing, LLC, Redmond, WA (US)

(72) Inventors: Jason Thomas Faulkner, Seattle, WA (US); Kenton O'Hara, Bristol (GB); Ewin Davis Kannuthottiyil, Prague (CZ); Edward Sean Lloyd Rintel, Cambridge (GB); Kevin Morrison, Arlington, MA (US); Robert Corish, London (GB); Anthony Wieser, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 110 days.

(21) Appl. No.: 15/480,332

(22) Filed: Apr. 5, 2017

(65) Prior Publication Data
US 2018/0124136 A1 May 3, 2018

Related U.S. Application Data

(60) Provisional application No. 62/415,403, filed on Oct. 31, 2016.

(51) Int. Cl.
*H04L 29/06* (2006.01)
*H04N 7/14* (2006.01)
(Continued)

(52) U.S. Cl.
CPC ........ *H04L 65/1093* (2013.01); *H04L 65/403* (2013.01); *H04L 65/4015* (2013.01);
(Continued)

(58) Field of Classification Search
CPC ................ H04L 65/4015; H04L 67/18; H04M 3/42263; H04M 7/0027; H04N 7/147
(Continued)

(56) References Cited

U.S. PATENT DOCUMENTS 7,279,060 B2   10/2007  Chen et al.
7,554,571 B1    6/2009  Beck
(Continued)

FOREIGN PATENT DOCUMENTS

CN   103053150 A   4/2013
CN   104685864 A   6/2015
(Continued)

OTHER PUBLICATIONS

Liu, C-C., and L-C. Kao. "Do handheld devices facilitate face-to-face collaboration? Handheld devices with large shared display groupware to facilitate group interactions." Journal of Computer Assisted Learning 23, No. 4 (2007): 285-299. (Year: 2007).*
(Continued)

*Primary Examiner* — Suraj M Joshi
*Assistant Examiner* — Melaku Y Habtemariam
(74) *Attorney, Agent, or Firm* — Scott Y. Shigeta; Newport IP, LLC

(57) ABSTRACT

The present disclosure provides a number of techniques for enhancing a user's experience when joining teleconference sessions with multiple devices. When a user attempts to join a teleconference session using the same user identity for multiple devices, a system differentiates the devices as a primary device and at least one companion device. The primary device has a first control set for controlling a teleconference session and the at least one companion device has a companion control set for sharing content. In some embodiments, the primary device also has one set of selected streams, e.g., a stage view, and the companion
(Continued)

device has a subset of those streams or other streams based on an activity level. In addition, the present disclosure provides a number of techniques for enabling users to share content using the companion devices.

20 Claims, 17 Drawing Sheets

(51) Int. Cl.
H04N 7/15 (2006.01)
H04M 7/00 (2006.01)
H04L 29/08 (2006.01)
H04M 3/56 (2006.01)
H04M 3/42 (2006.01)
G06F 3/0482 (2013.01)
H04L 65/1093 (2022.01)
H04L 67/52 (2022.01)
H04L 65/403 (2022.01)
H04L 67/75 (2022.01)
H04L 65/401 (2022.01)
H04L 67/303 (2022.01)
H04L 67/306 (2022.01)

(52) U.S. Cl.
CPC ............ *H04L 67/18* (2013.01); *H04L 67/303* (2013.01); *H04L 67/36* (2013.01); *H04M 3/42263* (2013.01); *H04M 3/568* (2013.01); *H04M 7/0027* (2013.01); *H04N 7/147* (2013.01); *H04N 7/15* (2013.01); *G06F 3/0482* (2013.01); *H04L 67/306* (2013.01); *H04M 3/563* (2013.01); *H04M 3/564* (2013.01); *H04M 2203/2094* (2013.01); *H04N 2007/145* (2013.01)

(58) Field of Classification Search
USPC .......................................... 709/205–207, 217
See application file for complete search history.

(56) References Cited

U.S. PATENT DOCUMENTS

| | | | |
|---|---|---|---|
| 8,081,205 B2 | 12/2011 | Baird et al. | |
| 8,350,891 B2 | 1/2013 | Khot et al. | |
| 8,379,077 B2 | 2/2013 | Wu et al. | |
| 8,503,651 B2 | 8/2013 | Virolainen et al. | |
| 8,786,517 B2 | 7/2014 | Lewin et al. | |
| 8,896,651 B2* | 11/2014 | Chu ................... | H04L 65/1069 348/14.02 |
| 8,934,382 B2 | 1/2015 | Rodman et al. | |
| 9,088,694 B2 | 7/2015 | Navon et al. | |
| 9,131,333 B2 | 9/2015 | Gai et al. | |
| 9,148,627 B2 | 9/2015 | Anderson et al. | |
| 9,172,908 B2 | 10/2015 | Kert et al. | |
| 9,369,672 B2 | 6/2016 | Hiller et al. | |
| 9,400,895 B2 | 7/2016 | Dadu et al. | |
| 9,445,054 B2 | 9/2016 | Kato | |
| 9,467,657 B2 | 10/2016 | Decker et al. | |
| 9,609,030 B2 | 3/2017 | Sun et al. | |
| 9,615,058 B2 | 4/2017 | Mattson | |
| 9,801,219 B2 | 10/2017 | Sonnino et al. | |
| 10,321,093 B2 | 6/2019 | Duckworth et al. | |
| 10,362,272 B1 | 7/2019 | Van Os et al. | |
| 10,368,032 B2 | 7/2019 | Visosky | |
| 10,824,384 B2 | 11/2020 | Somaiah et al. | |
| 10,838,681 B2 | 11/2020 | Watson et al. | |
| 10,841,174 B1 | 11/2020 | Ely et al. | |
| 10,999,331 B1 | 5/2021 | Marchand et al. | |
| 2003/0048174 A1 | 3/2003 | Stevens et al. | |
| 2003/0055977 A1* | 3/2003 | Miller ................ | H04L 29/06 709/227 |
| 2006/0092269 A1 | 5/2006 | Baird et al. | |
| 2006/0132473 A1 | 6/2006 | Fuller et al. | |
| 2006/0224882 A1 | 10/2006 | Chin | |
| 2007/0112942 A1 | 5/2007 | Moquin et al. | |
| 2007/0150953 A1 | 6/2007 | Hamid et al. | |
| 2007/0300165 A1 | 12/2007 | Haveliwala et al. | |
| 2008/0043986 A1 | 2/2008 | Darby et al. | |
| 2008/0160977 A1 | 7/2008 | Ahmaniemi et al. | |
| 2008/0281971 A1* | 11/2008 | Leppanen ........... | H04L 12/1818 709/228 |
| 2010/0009719 A1 | 1/2010 | Oh et al. | |
| 2011/0119389 A1* | 5/2011 | Cavin ................. | H04L 65/1069 709/228 |
| 2011/0271207 A1* | 11/2011 | Jones ..................... | H04W 4/21 715/753 |
| 2011/0292161 A1 | 12/2011 | Sharon et al. | |
| 2012/0280790 A1 | 11/2012 | Gerhardt et al. | |
| 2012/0284643 A1 | 11/2012 | Sitrick et al. | |
| 2012/0297306 A1 | 11/2012 | Hassan et al. | |
| 2013/0065526 A1 | 3/2013 | Pottier et al. | |
| 2013/0106976 A1 | 5/2013 | Chu et al. | |
| 2013/0111555 A1 | 5/2013 | Leneel | |
| 2013/0169526 A1 | 7/2013 | Gai et al. | |
| 2013/0214995 A1 | 8/2013 | Lewin et al. | |
| 2013/0219288 A1 | 8/2013 | Rosenberg | |
| 2013/0219303 A1 | 8/2013 | Eriksson et al. | |
| 2013/0295882 A1 | 11/2013 | Zhao | |
| 2014/0006495 A1* | 1/2014 | Adderly .............. | H04L 12/1822 709/204 |
| 2014/0026070 A1 | 1/2014 | Tandon et al. | |
| 2014/0028726 A1 | 1/2014 | Dave et al. | |
| 2014/0155169 A1* | 6/2014 | Crevin ..................... | A63H 3/28 463/39 |
| 2014/0157185 A1* | 6/2014 | Moromisato ......... | G06F 16/168 715/781 |
| 2014/0282967 A1 | 9/2014 | Maguire et al. | |
| 2014/0313282 A1* | 10/2014 | Ma ......................... | H04N 7/152 348/14.09 |
| 2014/0315489 A1 | 10/2014 | Lee | |
| 2014/0340468 A1 | 11/2014 | Winterstein | |
| 2014/0344446 A1 | 11/2014 | Rjeili et al. | |
| 2014/0368603 A1* | 12/2014 | Kert ........................ | H04N 7/15 348/14.08 |
| 2015/0124950 A1 | 5/2015 | Koenig | |
| 2015/0248468 A1* | 9/2015 | Cheng ..................... | H04L 63/08 707/621 |
| 2015/0271273 A1* | 9/2015 | Glass | |
| 2015/0347738 A1 | 12/2015 | Ulrich et al. | |
| 2016/0212181 A1 | 7/2016 | Zhang et al. | |
| 2016/0241605 A1 | 8/2016 | Taboriskiy et al. | |
| 2016/0261658 A1 | 9/2016 | Taylor et al. | |
| 2016/0323290 A1 | 11/2016 | Stead et al. | |
| 2016/0342784 A1 | 11/2016 | Beveridge et al. | |
| 2016/0366713 A1 | 12/2016 | Sonnino et al. | |
| 2016/0378417 A1 | 12/2016 | Kenjalkar | |
| 2017/0097678 A1 | 4/2017 | Mclean | |
| 2017/0104831 A1 | 4/2017 | Fransen | |
| 2017/0171699 A1 | 6/2017 | Jin et al. | |
| 2017/0244811 A1 | 8/2017 | McKenzie et al. | |
| 2017/0311365 A1 | 10/2017 | Molettiere et al. | |
| 2018/0267774 A1 | 9/2018 | Williams et al. | |
| 2018/0270340 A1 | 9/2018 | Ahmad et al. | |
| 2019/0173745 A1 | 6/2019 | Rjeili et al. | |
| 2019/0321732 A1 | 10/2019 | Zimring et al. | |
| 2019/0332344 A1 | 10/2019 | Somaiah et al. | |
| 2019/0372988 A1 | 12/2019 | Schirdewahn et al. | |
| 2021/0004454 A1 | 1/2021 | Chester et al. | |
| 2021/0045169 A1 | 2/2021 | Pupakdee et al. | |
| 2021/0136129 A1 | 5/2021 | Ponnusamy et al. | |
| 2021/0136130 A1 | 5/2021 | Ponnusamy et al. | |
| 2021/0136846 A1 | 5/2021 | Ponnusamy et al. | |

FOREIGN PATENT DOCUMENTS

| | | |
|---|---|---|
| CN | 105264883 A | 1/2016 |
| CN | 105474653 A | 4/2016 |
| CN | 105704426 A | 6/2016 |
| EP | 1220501 B1 | 7/2008 |
| EP | 2587799 A1 | 5/2013 |

(56) References Cited

FOREIGN PATENT DOCUMENTS

| WO | 0031608 A2 | 6/2000 |
| WO | 2016149294 A1 | 9/2016 |
| WO | 2016195825 A1 | 12/2016 |

OTHER PUBLICATIONS

"International Search Report and Written Opinion Issued in PCT Application No. PCT/US2017/057947", dated Feb. 8, 2018, 14 Pages.

"International Search Report and Written Opinion Issued in PCT Application No. PCT/US2017/057948", dated Feb. 8, 2018, 15 Pages.

"Non Final Office Action Issued in U.S. Appl. No. 15/480,325", dated Mar. 21, 2019, 13 Pages.

He, et al., "Real-time whiteboard capture and processing using a video camera for teleconferencing", In Proceedings of IEEE International Conference on Acoustics, Speech, and Signal Processing, 4 Pages.

Hornler, et al., "Multi-Modal Activity and Dominance Detection in Smart Meeting Rooms", In Proceedings of the IEEE International Conference on Acoustics, Speech, and Signal Processing, Apr. 19, 2009, pp. 1777-1780.

Rudnicky, et al., "Intelligently Integrating Information from Speech and Vision Processing to Perform Light-weight Meeting Understanding", In Proceedings of International Workshop on Multimodal Multiparty Meeting Processing, Oct. 2005, pp. 79-84.

"Highfive Sees 300 Percent Growth in Video-Enabled Meeting Rooms", http://www.marketwired.com/press-release/highfive-sees-300-percent-growth-in-video-enabled-meeting-rooms-2158891.htm. Published on: Sep. 15, 2016, 3 pages.

"How do I share my screen in Skype for Windows desktop?", https://support.skype.com/en/faq/FA10215/how-do-i-share-my-screen-in-skype-for-windows-desktop, Retrieved on: Oct. 21, 2016, 5 pages.

"Four Ways Polycom is Redefining Video Collaboration", http://www.polycom.com/products-services/realpresence-platform/realpresence-web-suite/redefining-video-collaboration.html, Retrieved on: Oct. 21, 2016, 4 pages.

"Share your screen", https://www.uberconference.com/screensharing, Retrieved on: Oct. 21, 2016, 5 pages.

"Screen share—free. With WebEx Meetings", https://www.webex.com/features/screen-share.html, Retrieved on: Oct. 21, 2016, 5 pages.

"Instructions", https://www.freeconferencecall.com/instructions, Published on: 2001, 11 pages.

"Share your screen during a Hangout", https://support.google.com/hangouts/answer/1660627?hl=en, Retrieved on: Oct. 21, 2016, 2 pages.

"GoToMeeting | Global Customer Support", http://support.citrixonline.com/en_US/meeting/help_files/G2M040004, Retrieved on: Oct. 21, 2016, 7 pages.

"Non-Final Office Action Issued in U.S. Appl. No. 15/480,325", dated Nov. 6, 2019,14 Pages.

"First Office Action and Search Report Issued in Chinese Patent Application No. 201780067116.9", dated May 26, 2020, 15 Pages.

Yang, et al., "New Business Development in Triple-Play", In the Journal of Telecommunications Science, vol. 27, Issue 3, Mar. 15, 2011, 6 pages.

"Final Office Action Issued in U.S. Appl. No. 15/480,325", dated Jun. 22, 2020, 5 Pages.

"Non-Final Office Action Issued in U.S. Appl. No. 16/724,116", dated Apr. 5, 2021, 15 Pages.

"International Search Report and the Written Opinion Issued in PCT Application No. PCT/US20/055451", dated Jan. 15, 2021, 11 Pages.

"Second Office Action and Search Report Issued in Chinese Patent Application No. 201780067116.9", dated Feb. 10, 2021, 14 Pages.

"Changing Your Own Video Layout", Retrieved from: https://documentation.avaya.com/bundle/UsingXTSeries_r91/page/xt1000_ug_calls_changeVideoLayout.html, Retrieved Date: Apr. 21, 2020, 3 Pages.

"Lock Your Windows 10 PC Automatically When You Step Away from It", Retrieved from: https://web.archive.org/web/20190518143337/https:/support.microsoft.com/en-in/help/4028111/windows-lock-your-windows-10-pc-automatically-when-you-step-away-from, May 18, 2019, 2 Pages.

"Using Dual Monitors with the Zoom Desktop Client", Retrieved from: https://support.zoom.us/hc/en-us/articles/201362583-Using-Dual-Monitors-with-the-Zoom-Desktop-Client?mobile_site=true, Retrieved Date: Apr. 21, 2020, 3 Pages.

"ViewSplit-Display Layout Software", Retrieved from: https://www.viewsonic.com/us/viewsplit.html, Mar. 18, 2017, 4 Pages.

"Non Final Office Action Issued in U.S. Appl. No. 15/480,325", dated Nov. 17, 2020, 16 Pages.

"Non Final Office Action Issued in U.S. Appl. No. 16/724,111", dated Nov. 4, 2020, 19 Pages.

"Final Office Action Issued in U.S. Appl. No. 16/724,116", dated Oct. 8, 2020, 13 Pages.

"Non Final Office Action Issued in U.S. Appl. No. 16/724,116", dated Jun. 11, 2020, 15 Pages.

"International Search Report and Written Opinion Issued in PCT Application No. PCT/US20/055444", dated Feb. 2, 2021, 13 Pages.

"International Search Report and Written Opinion Issued in PCT Application No. PCT/US20/055445", dated Jan. 28, 2021, 11 Pages.

"Notice of Allowance Issued in U.S. Appl. No. 16/724,111", dated Feb. 16, 2021, 6 Pages.

"Office Action Issued in Indian Patent Application No. 201947013660", dated Jun. 27, 2021, 7 Pages.

"Non-Final Office Action Issued in U.S. Appl. No. 16/714,329", dated Jun. 28, 2021, 21 Pages.

"Notice of Allowance Issued in U.S. Appl. No. 16/724,111", dated Jul. 22, 2021, 3 Pages.

"Notice of Allowance Issued in U.S. Appl. No. 16/724,111", dated Jul. 7, 2021, 6 Pages.

"Final Office Action Issued in U.S. Appl. No. 16/724,116", dated Sep. 3, 2021, 15 Pages.

Krumm, et al., "The NearMe Wireless Proximity Server", In Proceedings of the International Conference on Ubiquitous Computing, Sep. 7, 2004, pp. 283-300.

"Office Action Issued in European Patent Application No. 17794863.5", dated Sep. 30, 2021, 11 Pages.

\* cited by examiner

COMPANION DEVICES FOR REAL-TIME COLLABORATION IN COMMUNICATION SESSIONS

CROSS REFERENCE TO RELATED APPLICATION

This patent application claims the benefit of U.S. Provisional Patent Application Ser. No. 62/415,403 filed Oct. 31, 2016, entitled "ENHANCED TECHNIQUES FOR JOINING TELECONFERENCING SESSIONS," which is hereby incorporated in its entirety by reference.

BACKGROUND

Communication and collaboration are key aspects in people's lives, both socially and in business. Communication and collaboration tools have been developed with the aim of connecting people to share experiences. In many cases, the aim of these tools is to provide, over a network, an experience which mirrors real life interaction between individuals and groups of people. Interaction is typically provided by audio and/or visual elements.

Such tools include instant messaging, voice calls, video calls, group chat, shared desktop, shared media and content, shared applications, etc. Such tools can perform capture, manipulation, transmission, and reproduction of audio and visual elements, and use various combinations of such elements in an attempt to provide a collaborative environment. A user can access such tools at a user device which may be provided by a laptop or desktop computer, mobile phone, tablet, games console, etc. Such devices can be linked in a variety of possible network architectures, such as peer-to-peer architectures or client-server architectures or a hybrid, such as a centrally managed peer-to-peer architecture. In general, some or all of these architectures can facilitate a teleconference session to attempt to enable rich communication and collaboration somewhat similar to an in-person collaboration meeting.

However, when a user joins a teleconference session, some current technologies can leave much to be desired. For example, when a user joins a teleconference session using a first device, and later attempts to join the session using an additional device, existing systems may not utilize all of the resources in an efficient manner. For instance, in some existing systems, when a user joins a teleconference session utilizing two devices, each device displays an exact duplication of the session content. Thus, a second device in this scenario can't really be used to enhance the user's interaction with the shared media or the other session participants. In addition, in some instances, when the user joins a teleconference session utilizing more than one device, each device may cause audio interference.

As such, there is a need for improved teleconference technologies that addresses these and other issues.

SUMMARY

The present disclosure provides a number of techniques for enhancing a user's experience when joining teleconference sessions with multiple devices. When a user attempts to join a teleconference session using the same user identity for multiple devices, a system differentiates the devices as a primary device and at least one companion device. The primary device has a first control set for controlling a teleconference session and the at least one companion device has a companion control set for sharing content. In some embodiments, the primary device also has one set of selected streams, e.g., a stage view, and the companion device has a subset of those streams or other streams based on an activity level. In addition, the present disclosure provides a number of techniques for enabling users to readily share content using the companion devices.

In some configurations, a teleconference system can generate teleconference data comprising a plurality of streams associated with a teleconference session. The teleconference system can also receive a first request to join the teleconference session from a first computing device associated with a first user identity. The first user identity may be associated with a particular user or participant of the teleconference session. Furthermore, the request can be instantiated at the first computing device using a user interface. The first computing device can be a primary device configured to anchor an immersive teleconference experience.

Responsive to the request, the teleconference system can communicate the teleconference data to the first computing device for displaying, or causing a display of, a primary user interface. In one configuration, the primary user interface includes a rendering of the plurality of streams. The rendering of the plurality of streams may include one or more renderings of individual streams arranged within a user interface. This display can be referred to herein as a "stage" view of a teleconference session. In addition, the teleconference system can also cause the first computing device to display a first control set for controlling aspects of the teleconference session. For instance, the first control set, also referred to herein as "core controls," can be used to and exit the session, mute the sound of the session, etc.

The teleconference system can also receive a second request to join the teleconference session from a second computing device associated with the first user identity. The second computing device can be used by the same user associated with the first user identity. The teleconference system can cause the second computing device to display a secondary user interface having companion controls for sharing content. In addition, the teleconference system can cause the second computing device to display a selection of streams that can be arranged to present a reduced or otherwise streamlined portion of teleconference data for mitigating or avoiding distractions, interference, and other elements that can disrupt the teleconference session.

Responsive to the second request, the teleconference system can select at least one stream of the plurality of streams based on an activity level or other values. Having selected the at least one stream, the teleconference system can communicate the teleconference data to the second computing device causing the second computing device to display a companion user interface. The companion user interface can include a rendering of the at least one stream. Accordingly, while the first device may receive teleconference data having the plurality of streams, the second device may be configured to only receive a sub-portion, or a selected at least one stream. Thus, by efficiently communicating sub-portions of the teleconference data having related, and in some cases salient content, but non-duplicative content, the teleconference system can overcome many technical drawbacks associated with conventional teleconference systems.

It is noted that several other forms of establishing a teleconference session based on a single user identity and multiple user devices are described herein. According to one illustrative example, a teleconference system can also receive requests to join a teleconference session from a plurality of computing devices. The teleconference system can generate teleconference data associated with the teleconference session and distribute the teleconference data to primary and companion devices similarly as described above, or in any desired order.

Thus, somewhat similar to the aspects presented above, the teleconference system can differentiate across multiple devices joining a teleconference session to identify multiple devices associated with a single user identity. Thereafter, the teleconference system can communicate the teleconference data for causing a display of the plurality of streams on a primary device associated with a user and communicate teleconference data for causing a display of at least one selected stream in companion devices associated with the user.

According to another illustrative example, a first computing device can transmit a first request to join a teleconference session. The first computing device can be associated with a first user identity. The first computing device, responsive to the request, can receive first teleconference data comprising a plurality of streams associated with the teleconference session. The first computing device can also display a rendering of the plurality of streams.

Additionally, a second computing device can transmit a second request to join the teleconference session. The second computing device can also be associated with the first user identity. Responsive to the second request, the second computing device can receive second teleconference data comprising a subset of streams of the plurality of streams. The second computing device can also display a rendering of the subset of streams of the plurality of streams. The subset of streams of the plurality of streams can be based at least in part on data indicating an activity level associated with the subset of streams. Thus, in this example, while a user first joined a teleconference session using a first device, the user also subsequently introduced a second "companion" device to enhance the teleconference experience. The converse, where a user first joins a teleconference session using a companion device and then joins the teleconference session using a first device may also be applicable.

In some aspects, the user can also utilize control commands that are associated with a primary device and sharing commands that are associated with a companion device. The user can reconfigure the commands on each device in response to a user providing an input command, such as a reconfigure command. Accordingly, the teleconference system can facilitate a "device swap" by effectively switching primary and companion devices for the user. Reverse swaps are also possible in some implementations.

Furthermore, the user can also utilize control commands and reconfigure commands to allow devices to seamlessly "drop out" of a teleconference session. In one example, the teleconference system can receive a reconfiguring command for causing a transition to the first computing device from the second computing device. In response to receiving the reconfiguring command, the teleconference system can discontinue communicating the teleconference data to the second computing device. Thus, the second computing device may drop out, and the first computing device may take over as a sole primary device associated with the first user identity.

Other types of commands for enriching a user experience are also disclosed. For example, these commands can allow limiting or augmenting any particular device from one mode of operation to another mode of operation. In one illustrative example, two or more modes of operation may be established by the teleconference system for the first user identity. These modes of operation can include, for example, a primary mode of operation and a companion mode of operation. Therefore, once a device enters a teleconference session, different types of contextual user interfaces can be displayed for allowing a user to access and share relevant information based on these modes of operation. For example, a companion control menu can be displayed for enabling a companion device to be used to readily select various types of media data to be shared. Furthermore, a primary control menu can be displayed for enabling control of the primary device. The combination of the control menus and the use of the modes of operation enable a user to join the teleconference session in a way that reduces distractions while also allowing the user to select and share the most relevant content across more than one device.

As will be described in more detail below, in addition to establishing a primary device and primary and companion modes of operation, the teleconference system can also manipulate components of the primary and companion devices to enhance the teleconference session and limit disruption. For example, the teleconference system can remotely disable a camera component of one or more computing devices such that only a single "primary" or "face view" camera is associated with a single user identity. Additionally, the teleconference system can remotely disable an audio component of one or more devices to limit audio feedback from the user's devices. Other manipulation of these components can also be possible, for example, through selective activation to allow a user to use a "roving camera" on a companion device to share a unique view from a companion device that is separate and unique from a camera view on the primary device.

As will be described in greater detail below, the technologies described herein related to the teleconference system can be combined in multiple manners to enable participation of users in a variety of scenarios including scenarios where users have multiple devices which are used to enrich a teleconference session.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
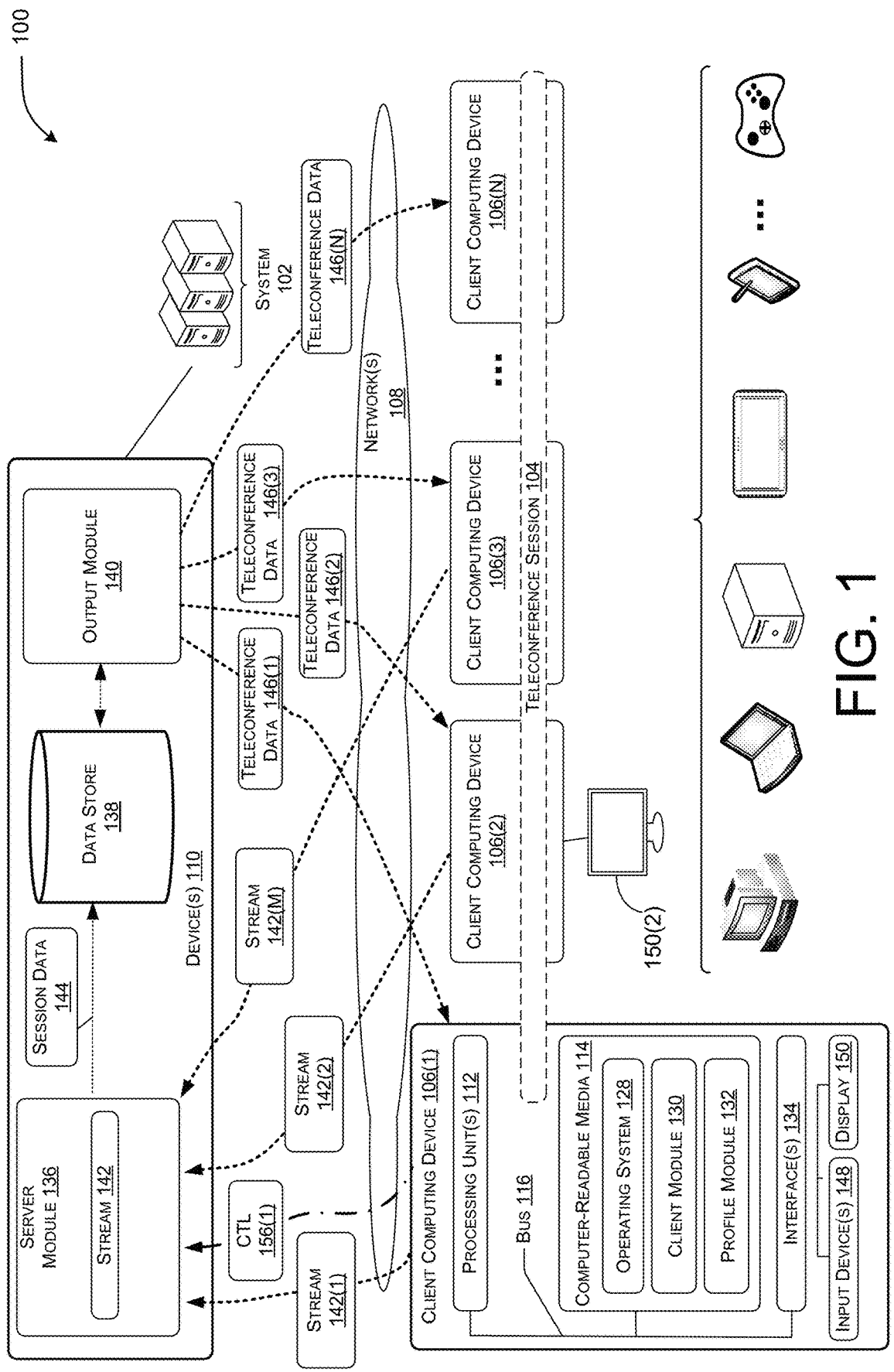
FIG. 1 is a diagram illustrating an example environment in which a system can operate to facilitate companion devices for real-time collaboration in teleconference sessions.

The present disclosure provides a number of techniques for enhancing a user's experience when joining teleconference sessions with multiple devices. Prior to joining a teleconference session, a teleconference system can generate teleconference data comprising a plurality of streams associated with a teleconference session. The teleconference system can also receive a first request to join the teleconference session from a first computing device associated with a first user identity. The first user identity may be associated with a particular user or participant of the teleconference session. Furthermore, the request can be instantiated at the first computing device using a user interface. The first computing device can be a primary device configured to anchor an immersive teleconference experience.

Responsive to the request, the teleconference system can communicate the teleconference data to the first computing device for displaying, or causing to display, a primary user interface. In one configuration, the primary user interface includes a rendering of the plurality of streams. The rendering of the plurality of streams may include one or more renderings of individual streams arranged within a user interface. Thus, the first computing device can display renderings of one or more streams associated with the teleconference data.

The teleconference system can also receive a second request to join the teleconference session from a second computing device associated with the first user identity. The second computing device can be used by the same user associated with the first user identity. The second computing device can be similar in arrangement to the first computing device, or can be a different form of computing device. Generally, the second computing device can be a computing device, such as a companion device, arranged to present a reduced or otherwise streamlined portion of teleconference data while avoiding distractions, interference, and other elements that can disrupt the teleconference session.

Responsive to the second request, the teleconference system can select at least one stream of the plurality of streams based on an activity level or other values. Having selected the at least one stream, the teleconference system can communicate the teleconference data to the second computing device causing the second computing device to display a companion user interface. The companion user interface can include a rendering of the at least one stream. Accordingly, while the first device may receive teleconference data having a plurality of streams, the second device may be configured to only receive a sub-portion, or a selected at least one stream. Thus, by efficiently communicating sub-portions of the teleconference data having related, and in some cases salient content, but non-duplicative content, the teleconference system can overcome many technical drawbacks associated with conventional teleconference systems.

It is noted that several other forms of establishing a teleconference session based on a single user identity and multiple user devices are described herein. According to one illustrative example, a teleconference system can also receive requests to join a teleconference session from a plurality of computing devices. The teleconference system can generate teleconference data associated with the teleconference session and distribute the teleconference data to primary and companion devices similarly as described above, or in any desired order.

Thus, somewhat similar to the aspects presented above, the teleconference system can differentiate across multiple devices joining a teleconference session to identify multiple devices associated with a single user identity. Thereafter, the teleconference system can communicate the teleconference data for causing to display a rendering of the plurality of streams and communicate teleconference data for causing to display a rendering of at least one selected stream.

According to another illustrative example, a first computing device can transmit a first request to join a teleconference session. The first computing device can be associated with a first user identity. The first computing device, responsive to the request, can receive first teleconference data comprising a plurality of streams associated with the teleconference session. The first computing device can also display a rendering of the plurality of streams.

Additionally, a second computing device can transmit a second request to join the teleconference session. The second computing device can also be associated with the first user identity. Responsive to the second request, the second computing device can receive second teleconference data comprising a subset of streams of the plurality of streams. The second computing device can also display a rendering of the subset of streams of the plurality of streams. The subset of streams of the plurality of streams can be based at least in part on data indicating an activity level associated with the subset of streams. Thus, in this example, while a user first joined a teleconference session using a first device, the user also introduced a second "companion" device to augment the teleconference experience. The converse, where a user first joins a teleconference session using a companion device and then later joined using a first device may also be applicable.

In some aspects, the user can also utilize control commands and reconfigure commands to transfer association as primary and companion modes of operation between the devices. For example, the teleconference system can communicate different teleconference data to each device based on the control and reconfigure commands. Accordingly, the teleconference system can facilitate a "device swap" by effectively switching primary and companion modes of operation for devices for the user. Reverse swaps are also possible in some implementations.

Furthermore, the user can also utilize control command and reconfigure commands to allow devices to seamlessly "drop out" of a teleconference session. In one example, the teleconference system can receive a reconfiguring command for causing a transition to the first computing device from the second computing device. In response to receiving the reconfiguring command, the teleconference system can discontinue communicating the teleconference data to the second computing device. Thus, the second computing device may drop out, and the first computing device may take over as a sole primary device associated with the first user identity.

Other types of commands for enriching a user experience are also disclosed. For example, these commands can allow limiting or augmenting any particular device from a mode of operation to another mode of operation. In one illustrative example, two or more modes of operation may be established by the teleconference system for the first user identity. These modes of operation can include, for example, a primary mode of operation and a companion mode of operation. Therefore, once a device enters a teleconference session, different types of contextual user interfaces can be displayed for allowing a user to access and share relevant information based on these modes of operation. For example, a companion control menu can be displayed for enabling a companion device to be used to readily select various types of media data to be shared. Furthermore, a primary control menu can be displayed for enabling control of the primary device. The combination of the control menus and the use of the modes of operation enable a user to join the teleconference session in a way that reduces distractions while also allowing the user to select and share the most relevant content across more than one device.

As will be described in more detail below, in addition to establishing a primary device and primary and companion modes of operation, the teleconference system can also manipulate components of the primary and companion devices to enhance the teleconference session and limit disruption. For example, the teleconference system can remotely disable a camera component of one or more computing devices such that only a single "primary" or "face view" camera is associated with a single user identity. Additionally, the teleconference system can remotely disable an audio component of one or more devices to limit audio feedback from the user's devices. Other manipulation of these components can also be possible, for example, through selective activation to allow a user to use a "roving camera" on a companion device to share a unique view from a companion device that is separate and unique from a camera view on the primary device.

As will be described in greater detail below, the technologies described herein related to the teleconference system can be combined in multiple manners to enable participation of users in a variety of scenarios including scenarios where users have multiple devices used to join a teleconference session, while avoiding duplicative experiences, increasing efficient use of resources, and enriching the teleconference session. Various examples, scenarios, and aspects are described below with reference to FIGS. 1-8.

In FIG. 1, a diagram illustrating an example of a teleconference system 100 is shown in which a system 102 can operate to provide a teleconference session 104 in accordance with an example implementation. In this example, the teleconference session 104 is between a number of client computing devices 106(1) through 106(N) (where N is a positive integer number having a value of two or greater). The client computing devices 106(1) through 106(N) enable users to participate in the teleconference session 104. In this example, the teleconference session 104 may be hosted, over one or more network(s) 108, by the system 102. That is, the system 102 may provide a service that enables users of the client computing devices 106(1) through 106(N) to participate in the teleconference session 104. As an alternative, the teleconference session 104 may be hosted by one of the client computing devices 106(1) through 106(N) utilizing peer-to-peer technologies.

The system 102 includes device(s) 110 and the device(s) 110 and/or other components of the system 102 may include distributed computing devices that communicate with one another, with the system 102, and/or with the client computing devices 106(1) through 106(N) via the one or more network(s) 108. In some examples, the system 102 may be an independent system that is tasked with managing aspects of one or more teleconference sessions 104. As an example, the system 102 may be managed by entities such as SLACK®, WEBEX®, GOTOMEETING®, GOOGLE HANGOUTS®, etc.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device—a server-type device—device(s) 110 may include a diverse variety of device types and are not limited to a particular type of device. Device(s) 110 may represent, but are not limited to, server computers, desktop computers, web-server computers, personal computers, mobile computers, laptop computers, mobile phones, tablet computers, or any other sort of computing device.

A client computing device (e.g., one of client computing device(s) 106(1) through 106(N)) may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. In some implementations, a client computing device includes input/output ("I/O") interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display, a printer, audio speakers, a haptic output device, and the like).

Client computing device(s) 106(1) through 106(N) of the various classes and device types can represent any type of computing device having one or more processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses.

Executable instructions stored on computer-readable media 114 may include, for example, an operating system 128, a client module 130, a profile module 132, and other modules, programs, or applications that are loadable and executable by processing units(s) 112.

Client computing device(s) 106(1) through 106(N) may also include one or more interface(s) 134 to enable communications with other input devices 148 such as network interfaces, cameras, keyboards, touch screens, and pointing devices (mouse). For example, the interface(s) 134 can also enable communications between client computing device(s) 106(1) through 106(N) and other networked devices, such as device(s) 110 and/or devices of the system 102, over network(s) 108. Such network interface(s) 134 may include one or more network interface controllers (NICs) or other types of transceiver devices to send and receive communications and/or data over a network.

In the example environment 100 of FIG. 1, client computing devices 106(1) through 106(N) may use their respective client modules 130 to connect with one another and/or other external device(s) in order to participate in the teleconference session 104. For instance, a first user may utilize a client computing device 106(1) to communicate with a second user of another client computing device 106(2). When executing client modules 130, the users may share data, which may cause the client computing device 106(1) to connect to the system 102 and the other client computing devices 106(2) through 106(N) to connect over the network 108.

The client module 130 of each client computing device 106(1) through 106(N) may include logic that detects user input and communicates control signals to the server module 136 to request changes in the teleconference session 104 on the display. For example, the client module 130 in the first client computing device 106(1) in FIG. 1 may detect a user input at an input device 148. The user input may be sensed, for example, as a finger press on a user interface element displayed on a touchscreen (e.g., touchscreen 150(2)), or as a click of a mouse on a user interface element selected by a pointer on the display 150. The client module 130 translates the user input according to a function associated with the selected user interface element. In some cases, the client module 130 may require the teleconference session 104 to perform a function. In this case, the client module 130 sends a control signal 156(1) to the server module 136 for service by the teleconference session 104.

In one example function, the user of the client computing device 106(1) may wish to cause a transition from a first mode of operation of the client computing device 106(1) to a second mode of operation, for the teleconference session 104. The user may click on the desired user interface element on the user's display 150. In response, the client module 130 sends the control signal 156(1) to the server module 136. The server module 136 would, in response to the control signal 156(1) perform the desired transition based on the teleconference data 146(1), data indicating locations of one or more of the other computing devices 106, and other suitable information.

The client computing device(s) 106(1)-through-106(N) may use their respective profile modules 132 to generate participant profiles, and provide the participant profiles to other client computing devices and/or to the device(s) 110 of the system 102. A participant profile may include one or more of an identity of a participant (e.g., a name, user identity, a unique identifier ("ID"), etc.), participant data, such as personal data and location data may also be stored. Participant profiles may be utilized to register participants for teleconference sessions 104 and to indicate priority or preferences associated with a user identity and/or client computing device.

As shown in FIG. 1, the device(s) 110 of the system 102 includes a server module 136, a data store 138, and an output module 140. The server module 136 is configured to receive, from individual client computing devices 106(1) through 106(N), stream 142(1) through 142(M) (where M is a positive integer number equal to 2 or greater). In some scenarios, not all the client computing devices utilized to participate in the teleconference session 104 provide an instance of streams 142, and thus, M (the number of instances submitted) may not be equal to N (the number of client computing devices). In some other scenarios, one or more of the client computing devices may be communicating an additional stream or transmission of media data that includes content, such as a document or other similar type of media intended to be shared during the teleconference session 104.

The server module 136 is also configured to receive, generate, and communicate session data 144 and to store the session data 144 in the data store 138. In various examples, the server module 136 may select aspects of the streams 142 that are to be shared with the client computing devices 106(1) through 106(N). The server module 136 may combine the streams 142 to generate teleconference data 146 defining aspects of the teleconference session 104. The teleconference data 146 can comprise select streams 142. The teleconference data 146 can define aspects of the teleconference session 104, such as a user interface arrangement of the user interfaces on the client computing devices 106, the type of data that is displayed, and other functions of the server and clients. The server module 136 may configure the teleconference data 146 for the individual client computing devices 106(1) through 106(N). Teleconference data 146 can include individual instances referenced as 146(1) through 146(N). Furthermore, teleconference data 146 can include first teleconference data 142(1) for communication with a primary computing device, and second teleconference data 142(2) through 142(N) for communication with a companion computing device. The output module 140 may communicate the teleconference data instances 146(1) through 146(N) to the client computing devices 106(1) through 106(N). Specifically, in this example, the output module 140 communicates teleconference data 146(1) to client computing device 106(1), teleconference data 146(2) to client computing device 106(2), teleconference data 146(3) to client computing device 106(3), and teleconference data 146(N) to client computing device 106(N), respectively.

The teleconference data instances 146(1) through 146(N) may communicate audio that may include video representative of the contribution of each participant in the teleconference session 104. Each teleconference data instance 146(1) through 146(N) may also be configured in a manner that is unique to the needs of each participant user of the client computing devices 106(1) through 106(N). Each client computing device 106(1) through 106(N) may be associated with a teleconference session view. Examples of the use of teleconference session views to control the views for each participant at the client computing devices are described with reference to FIG. 2.

Figure 2:
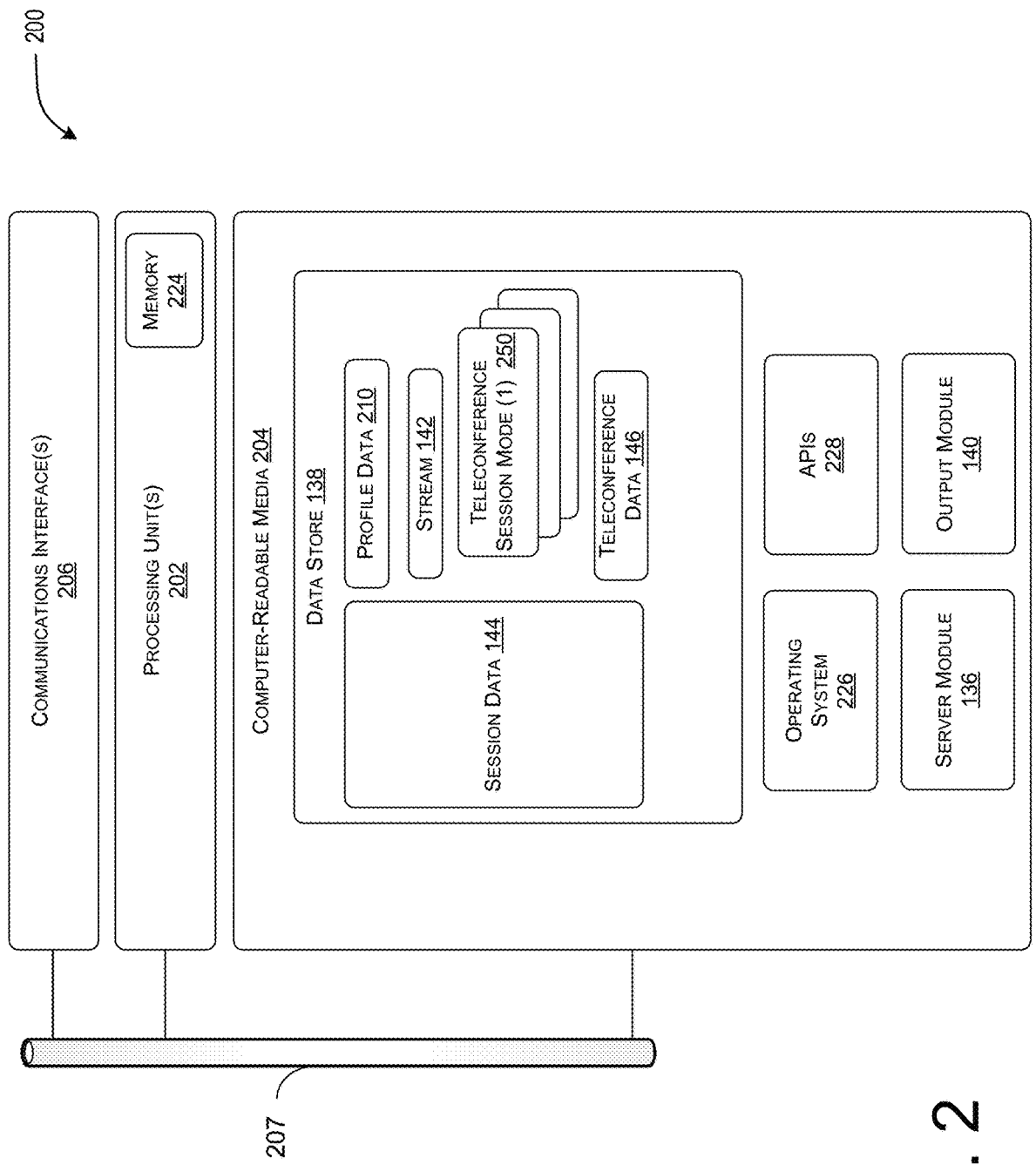
FIG. 2 is a diagram illustrating components of an example computing device configured to facilitate companion devices for real-time collaboration in teleconference sessions.

In FIG. 2, a system block diagram is shown illustrating components of an example device 200 configured to provide the teleconference session 104 between the client computing devices, such as client computing devices 106(1) through 106(N) in accordance with an example implementation. The device 200 can be used to illustrate some components of one of the client computing devices 106. In addition, the device 200 may represent one of device(s) 110 where the device 200 includes one or more processing unit(s) 202, computer-readable media 204, and communication interface(s) 206. The components of the device 200 are operatively connected, for example, via a bus 207, which may include one or more of a system bus, a data bus, an address bus, a PCI bus, a Mini-PCI bus, and any variety of local, peripheral, and/or independent buses.

As utilized herein, processing unit(s), such as the processing unit(s) 202 and/or processing unit(s) 112, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 204 and/or computer-readable media 114, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 206 may represent, for example, network interface controllers ("NICs") or other types of transceiver devices to send and receive communications over a network.

In the illustrated example, computer-readable media 204 includes the data store 138. In some examples, the data store 138 includes data storage such as a database, data warehouse, or other type of structured or unstructured data storage. In some examples, the data store 138 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 138 may store data for the operations of processes, applications, components, and/or modules stored in computer-readable media 204 and/or executed by processing unit(s) 202 and/or accelerator(s). For instance, in some examples, the data store 138 may store session data 144, profile data 210, and/or other data. The session data 208 may include a total number of users in the teleconference session 104, and activity that occurs in the teleconference session 104 (e.g., behavior, activity of the participants), and/or other data related to when and how the teleconference session 104 is conducted or hosted. Examples of profile data 210 include, but are not limited to, a user identity ("ID"), priority value, and other data.

In an example implementation, the data store 138 stores data related to the view each user experiences on the display of the users' client computing devices 106. As shown in FIG. 2, the data store 138 may include a teleconference session mode 250(1) through 250(N) corresponding to the operating mode of each client computing device 106(1) through 106(N) participating in the teleconference session 104. The teleconference session mode 250 may also be termed a "mode of operation" herein. Utilizing the teleconference session mode 250, the teleconference system 102 may support individual control over the view and mode each user experiences across multiple devices during the teleconference session 104. For example, as described in more detail below, the system 102 permits a user to participate with the user's client computing device 106 operating in one of several modes of operation.

The modes of operation can include, for example, a primary mode of operation and a companion mode of operation. Once a computing device 106 enters the teleconference session 104, different types of contextual user interfaces can be displayed on the display 150 for enabling users to access and share relevant information based on these modes of operation. For example, a companion control menu can be displayed for enabling a user to readily select various types of media data to be shared by a user's companion computing device. Furthermore, a primary control menu can be displayed for enabling control of a state of the teleconference session 104 at a user's primary computing device. The combination of the control menus and the use of the modes of operation allow users to join the teleconference session 104 with multiple devices in a manner that reduces distractions while also allowing users to select and share the most relevant content. In general, a primary device can be selected by the teleconference system 102 to operate in the primary mode of operation. Additionally, one or more companion devices can be selected by the teleconference system 102 to operate in the companion mode of operation.

Several methods for selection of a primary device, and therefore establishment of the primary and companion modes of operation, can be facilitated using the technologies described herein. For example, a primary device can be selected based on an order of the devices attempting to join the teleconference session 104, when associated with a single user identity. Thus, a user's first device to attempt to join can be selected as the primary device. In other aspects, the teleconference system 102 can analyze priority values associated with one or more computing devices to determine that a user's first computing device has a priority value superseding priority values of the other computing devices associated with the same user identity.

In addition to establishing a primary device and primary and companion modes of operation, the teleconference system 102 can also manipulate components of companion devices to enhance the teleconference session 104 and limit disruption. For example, the teleconference system 102 can remotely disable a camera component (e.g., input devices 148) of companion computing devices. Additionally, the teleconference system 102 can remotely disable an audio component (e.g., input device 148) of companion computing devices. Other manipulation of these components can also be possible, for example, through selective activation to allow a user to "take the stage" or share content using a companion device rather than a primary device.

As noted above, the data store 138 may store the profile data 210, streams 142, teleconference session modes 250, teleconference data 146, and session data 144. Alternately, some or all of the above-referenced data can be stored on separate memories 224 on board one or more processing unit(s) 202 such as a memory on board a CPU-type processor, a GPU-type processor, an FPGA-type accelerator, a DSP-type accelerator, and/or another accelerator. In this example, the computer-readable media 204 also includes an operating system 226 and application programming interface(s) 228 configured to expose the functionality and the data of the device(s) 110 (e.g., example device 200) to external devices associated with the client computing devices 106(1) through 106(N). Additionally, the computer-readable media 204 includes one or more modules such as the server module 136 and an output module 140, although the number of illustrated modules is just an example, and the number may vary higher or lower. That is, functionality described herein in association with the illustrated modules may be performed by a fewer number of modules or a larger number of modules on one device or spread across multiple devices.

As such and as described earlier, in general, the teleconference system 102 is configured to host the teleconference session 104 with the plurality of client computing devices 106(1) through 106(N). The teleconference system 102 includes one or more processing units 202 and a computer-readable medium 204 having encoded thereon computer-executable instructions to cause the one or more processing units 202 to receive streams 142(1) through 142(M) at the system 102 from a plurality of client computing devices 106(1) through 106(N), select streams 142 based, at least in part, on the teleconference session mode 250 for each user's computing device, and communicate a teleconference data 146 according to the teleconference session modes 250 corresponding to the client computing devices 106(1) through 106(N). The teleconference data 146(1) through 146(N) are communicated from the system 102 to the plurality of client computing devices 106(1) through 106(N). The teleconference session modes 250(1) through 250(N) cause the plurality of client computing devices 106(1) through 106(N) to display views of the teleconference session 104 under user control. The computer-executable instructions also cause the one or more processing units 202 to determine that the teleconference session 104 is to transition client computing devices 106(1) through 106(N) to a different teleconference session mode 250 based on a user communicated control signal 156, also referred to herein as a control command 156, and other suitable information. In some configurations, the control command 156 comprises at least one of a user identity, a request to join a teleconference session 104, an access request, a transfer request, or other data described herein.

In some implementations, the techniques disclosed herein may utilize one or more predetermined modes of operation, also referred to as "modes," or "teleconference session modes." In an example operation, the system 102 performs a method that includes receiving the streams 142(1) through 142(M) at the system 102 from a plurality of client computing devices 106(1) through 106(N), combining and formatting the streams 142 based, at least in part, on user identities for each client computing device to form a teleconference data 146(1) through 146(N), and transmitting a teleconference data 146(1) through 146(N) to respective client computing devices.

As will be described below, the predetermined modes of operation can include a first mode of operation (referred to herein as a "primary") and a second mode of operation (referred to herein as a "companion"). In some implementations, the primary and companion modes of operation can be configured automatically through intelligent selection of a primary and companion device using profile data accessible by the teleconference system 102. The predetermined modes of operation can also facilitate graphical elements providing control functionality ("control elements") for a teleconference session 104. For instance, a graphical element may be generated on the user interface enabling a user to provide content, end a session, mute one or more sounds, control other participants' streams, transition a particular device to a different mode of operation, etc.

In one illustrative example, the techniques disclosed below can utilize a primary mode of operation. The primary mode of operation may be a "fully functional" form of operation facilitating the anchoring of an immersive experience for a particular user. According to one aspect, only a single device associated with a user identity may be in the primary mode of operation. In the primary mode, an audio device such as a microphone may be enabled to receive audio information (e.g., sounds, voices, etc.) from the user. Also in the primary mode, a video device such as a forward-facing camera may be enabled to receive video information (e.g., video recording) from the user. Accordingly, the primary mode of operation, and therefore a device operating in the primary mode of operation, may be fully functional and receiving multiple forms of audio/video input from a participant.

In another illustrative example, the techniques disclosed herein can utilize a secondary mode of operation. The secondary mode of operation may be a "companion" form of operation facilitating the participation of a user with multiple devices while not detracting from the immersive experience provided by a primary device functioning in the primary mode of operation. According to one aspect, one or more computing devices associated with a single user identity may function in the companion mode of operation. In the companion mode, audio capture devices of the associated computing device may be disabled to mitigate audio feedback. Also in the companion mode, a camera device, such as a forward-facing camera, may be disabled depending upon whether video information is being actively shared from the associated device. In this manner, duplicative video streams and audio streams for the same user identity can be avoided while decreasing network usage and increasing efficiency of the teleconference system 102.

Generally, a selection of devices 106 to operate in the primary and companion modes of operation may be based on user identities and/or profile data 210 associated with a plurality of computing devices. For example, a user may use two or more computing devices 106 to join the teleconference session 104 by issuing a request 156 from each computing device 106 to join the teleconference session 104.

Responsive to the request 156 or requests, the teleconference system 102 can select a first computing device 106(1) as a primary computing device for operating in the primary mode of operation. In general, the primary computing device can be used to anchor an immersive experience for the user and limit disruption caused by conventional teleconference systems.

Following this selection, the teleconference system 102 can generate teleconference data 146 associated with a teleconference session 104. In one illustrative example, the teleconference data 146 can include participant streams 142 having video of one or more participants and content streams 142 having video or images of files, data structures, word processing documents, and other shareable content.

Having generated the teleconference data 146, the teleconference system 102 may communicate first teleconference data 146(1) to the primary computing device, and communicate second teleconference data 146(2) through 146(N) to the companion computing device(s). Accordingly, while the primary device is the only device receiving a first selection of teleconference data 146(1), the companion devices receive at least a sub-portion of the teleconference data, e.g., teleconference data 146(2) through 146N). Thus, by efficiently generating the primary and companion teleconference data 146 having related content, the teleconference system 102 of this illustrative example can overcome many technical drawbacks associated with conventional teleconference systems including wasted bandwidth, excessive use of computing resources of all client computing devices to process a first selection of teleconference data, and other drawbacks.

Hereinafter, a more detailed discussion of different scenarios involving an example teleconference session 104, various computing devices 106, and teleconference data 146 is described in detail. It is understood that these example scenarios are not limiting of all uses of the described technologies.

Figure 3A:
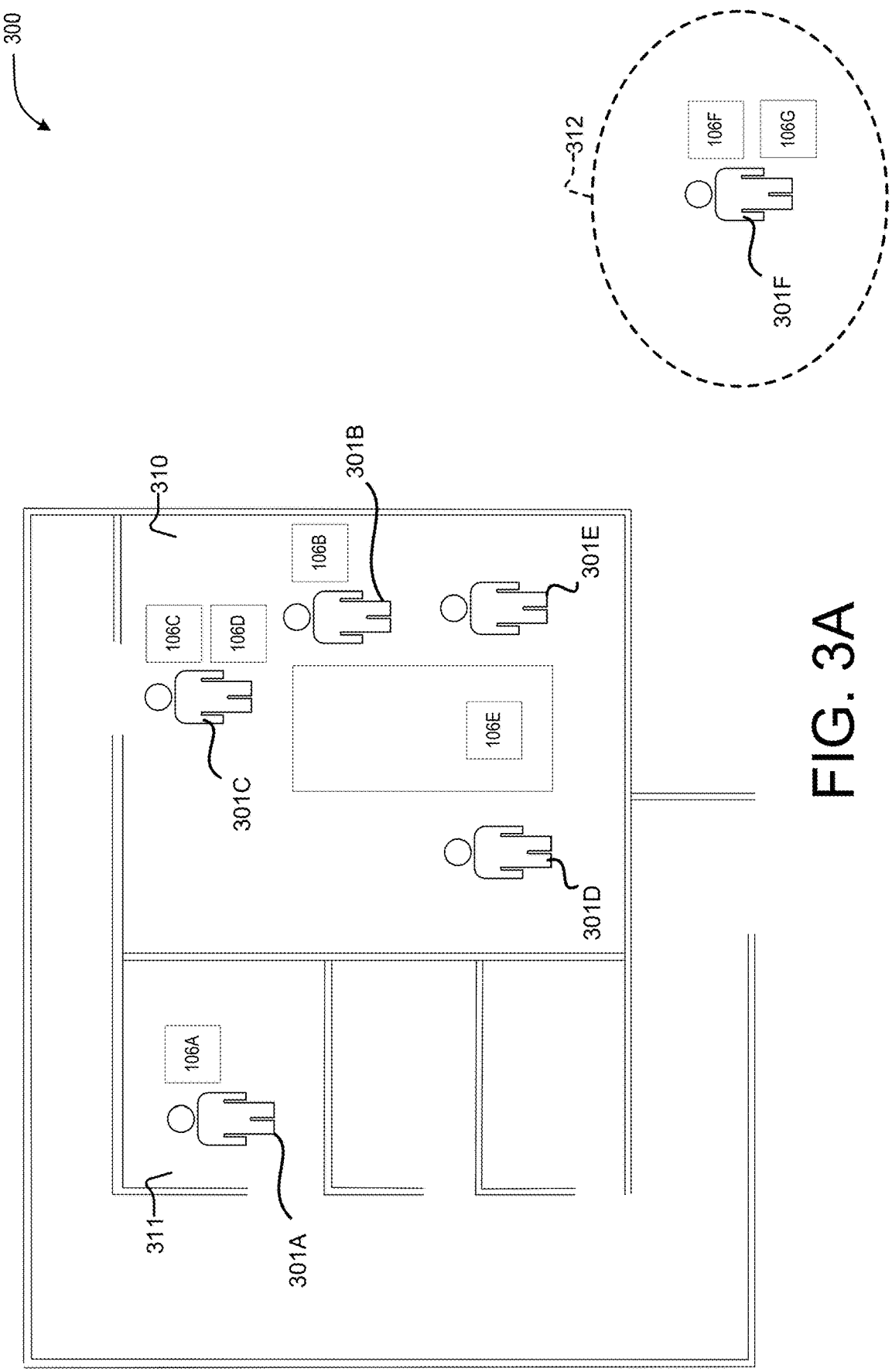
FIGS. 3A-3D illustrate several example scenarios where computing devices can be utilized to enable the techniques disclosed herein.

FIGS. 3A through 3D illustrate a number of scenarios where techniques of the present disclosure can be utilized. As shown in FIG. 3A, each user 301 is associated with one or more devices 106. The following description describes scenarios where individual users 301 join a teleconference session 104. The following examples show scenarios where devices can start in primary mode or companion mode.

In a first scenario, the first user 301A is associated with a first computing device 106A at a first location 311, which is used to call into a teleconference session 104 that is already in communication with a fifth computing device 106E utilized by a fourth user 301D and a fifth user 301E in a second location 310. Since the first user 301A is utilizing a single device, the first computing device 106A can enter the teleconference session 104 in the primary mode of operation. Thus, the microphone and the speaker of the first computing device 106A are turned on while the first computing device 106A joins the teleconference session. Additionally, both of the first computing device 106A and the fifth computing device 106E may operate in the primary mode of operation. Moreover, both of the first computing device 106A and the fifth computing device 106E can receive first teleconference data 146(1), which includes a first selection of teleconference data or streams 142.

In a second scenario, the first user 301A is utilizing the first computing device 106A to join the teleconference session 104, a second user 301B is utilizing a second computing device 106B to join the teleconference session 104, a third user 301C is utilizing a third computing device 106C and a fourth computing device 106D to join the teleconference session 104, the fourth user 301D is utilizing the fifth computing device 106E to join the teleconference session 104 and the fifth user 301E is utilizing the fifth computing device 106E to join the teleconference session 104. Generally, the first computing device 106A, the second computing device 106B, and the third computing device 106C may all join the teleconference session 104 in the primary mode of operation. However, as shown in FIG. 3A, the third computing device 106C and the fourth computing device 106D are associated with a single user identity (e.g., as associated with the third user 301C) and the third user 301C is using the third computing device 106C and the fourth computing device 106D to join the same teleconference session 104. Accordingly, the third computing device 106C may join the teleconference session 104 in the primary mode of operation while the fourth computing device 104D may join the teleconference session 104 in the companion mode of operation.

In an additional example, if the third user 301C first uses the third computing device 106C to join the teleconference session 104, the third computing device 106C may join the teleconference session 104 in the primary mode of operation. Subsequently, if the third user 301C also attempts to join the teleconference session 104 with the fourth computing device 106D, the fourth computing device 106D may join the teleconference session 104 in the companion mode of operation.

Figure 3B:
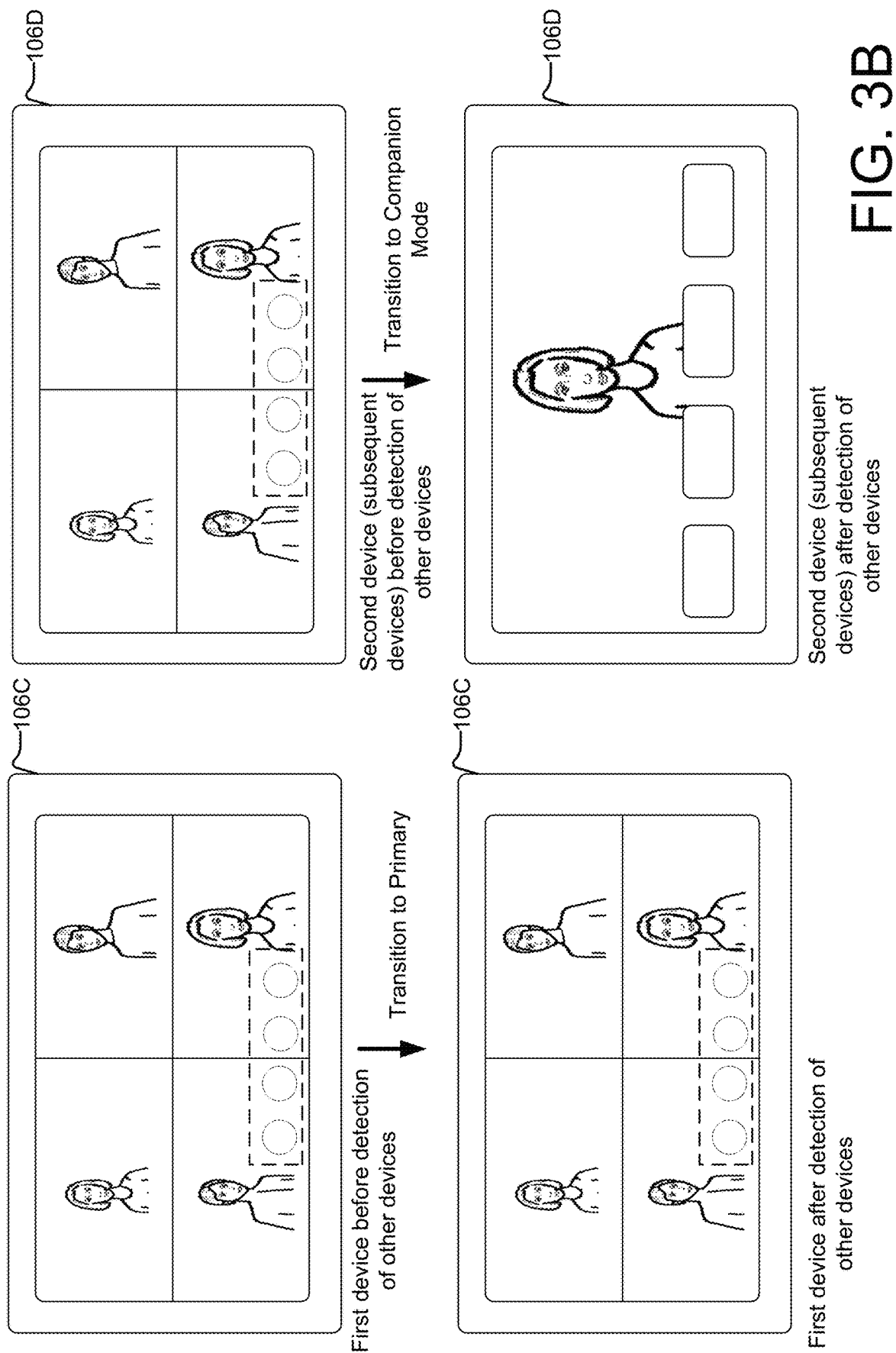

Additionally, as shown in FIG. 3B, both of the third computing device 106C and the fourth computing device 106D may initially join the teleconference session 104 in the primary mode of operation. Thereafter, upon determination that both of the third computing device 106C and the fourth computing device 106D are detected as being associated with the same user identity (e.g., of the fourth user 301D), the teleconference system 102 can transition the third computing device 103C to the primary mode of operation for user 301D, and can transition the fourth computing device 104D to the companion mode of operation. As illustrated, the companion mode of operation may include different user interface arrangements, renderings of streams, and other aspects as compared to the primary mode of operation.

As described herein, the primary device can be selected based on one or more factors. For example, the third computing device 106C can become the primary device if it is the first computing device to enter the teleconference session for a particular user identity. The third computing device 106C can also be selected as the primary device based on any suitable data, such as a priority level, user preference, or a user input. Third computing device 106C can also be selected as the primary device based on the device type. For example, if the third computing device 106C is a laptop and the fourth computing device 106D is a mobile phone, the third computing device 106C may be selected as the primary device based on the device type of the third computing device 106C having possibly increased capabilities as compared to the fourth computing device 104D. Other considerations in selecting primary devices may also be applicable.

Upon selecting or determining the third computing device 106C as the primary device, the teleconference system 102 can also select the fourth computing device 106D, as illustrated in FIG. 3B. As further shown, each of the primary and companion devices are configured to correspondingly operate in the primary or companion modes of operation.

Figure 3C:
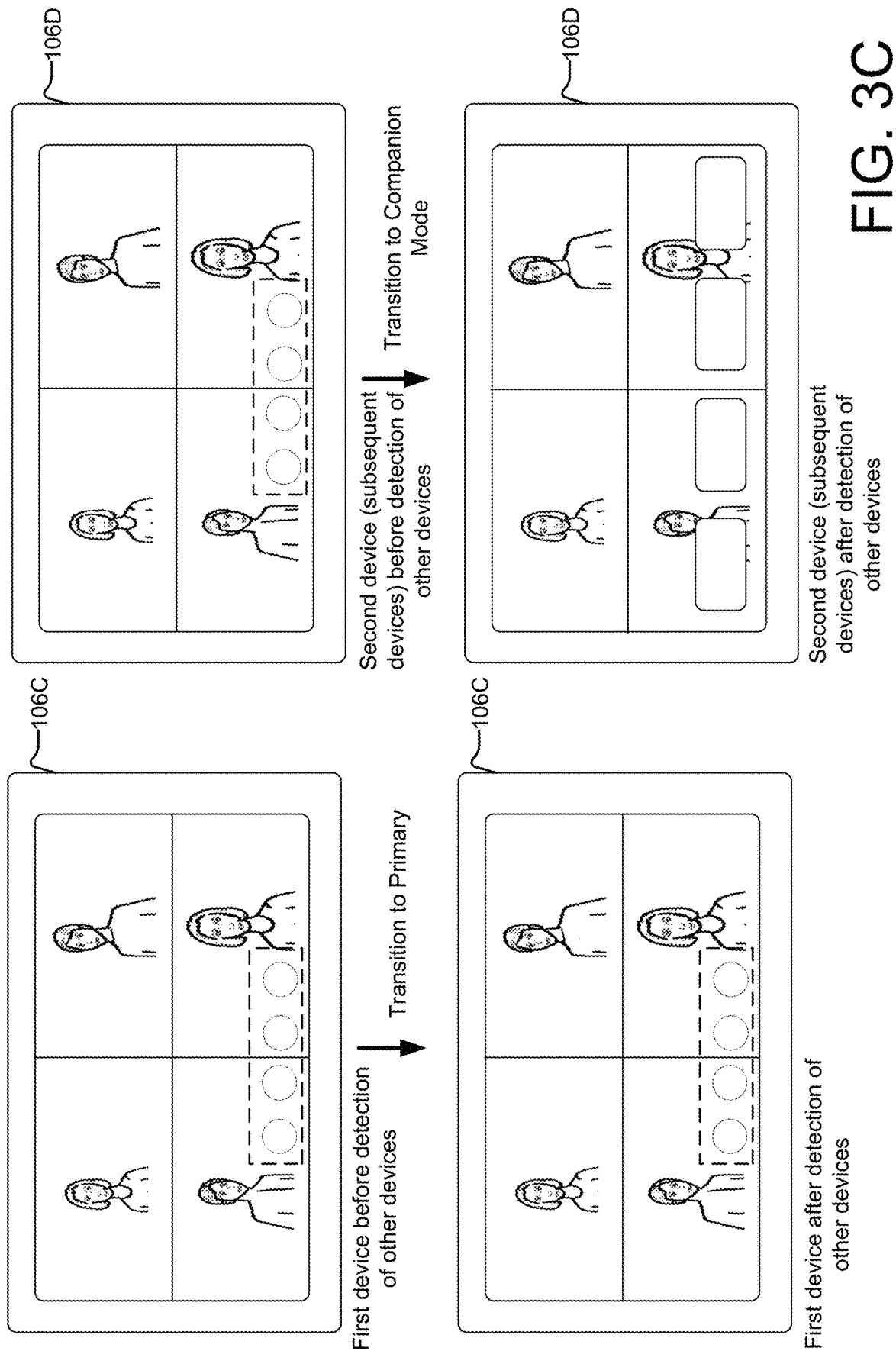

Continuing this scenario, the techniques described herein also allow for select streams of data to be presented at a companion device and a primary device. For example, as illustrated in FIG. 3C, the primary device 106C may include a rendering of a plurality of streams 142 and a set of core teleconference control elements. Furthermore, the companion device 106D may include a rendering of a selected plurality of streams 142(2) and a set of companion teleconference control elements.

Figure 3D:
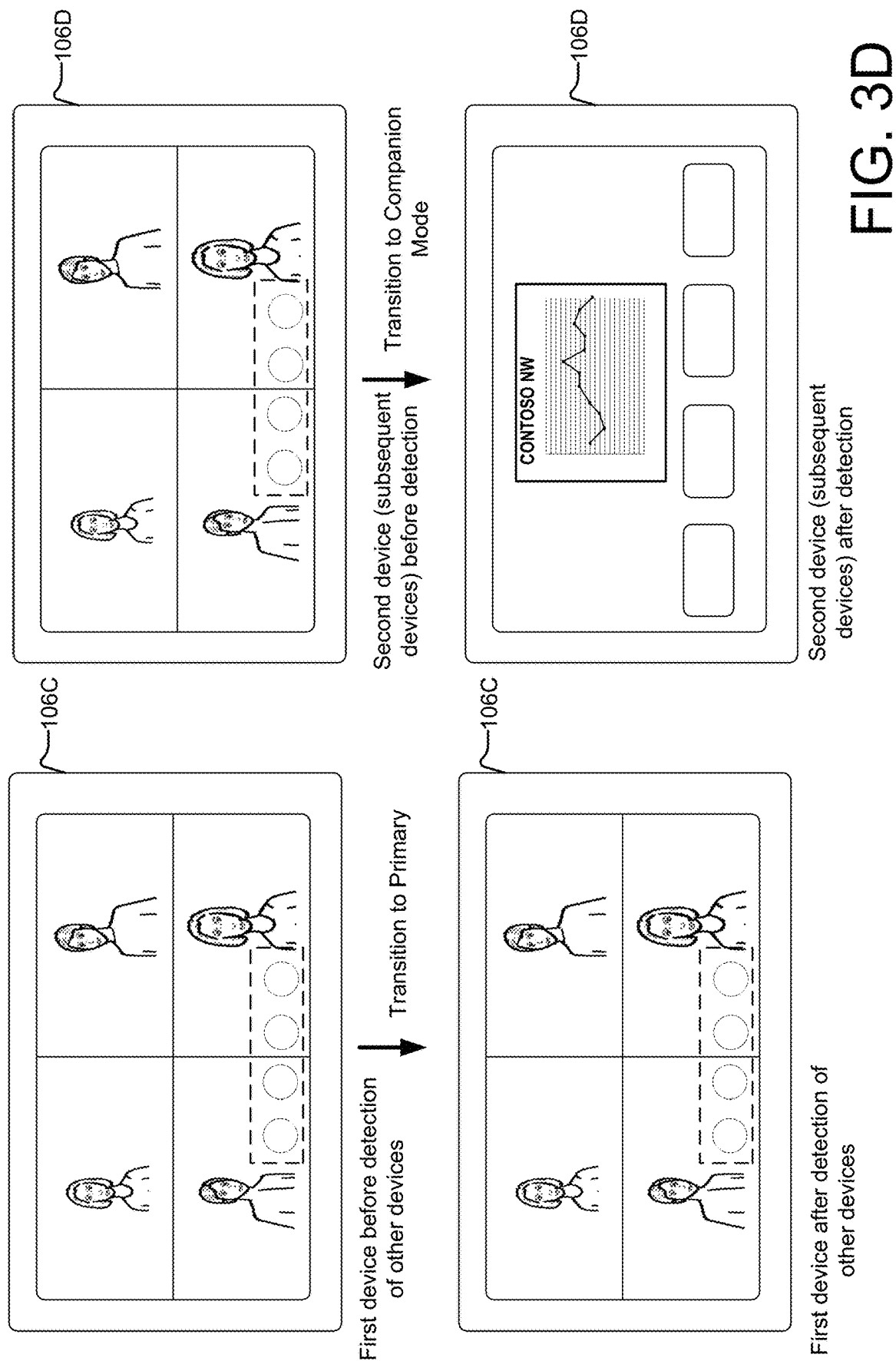

Additionally, as illustrated in FIG. 3D, the primary device 106C may include a rendering of a plurality of streams 142 and a set of core teleconference control elements. Furthermore, the companion device 106D may include a rendering of a selected content stream 142(2) based on an activity level and a set of companion teleconference control elements. Other alterations and combinations of these above described example scenarios and interface arrangements are also applicable.

Moreover, the techniques described herein may also apply to users joining from remote locations. As shown in FIG. 3A, a sixth user 301F is utilizing a sixth computing device 106F and a seventh computing device 106B to join the teleconference session 104. In this example, the sixth user 301F is at a remote location 312, separate from the second location 310. When the sixth user 301F utilizes the sixth computing device 106F to join the teleconference session 104, the sixth computing device 106F may join the teleconference session 104 in the primary mode such that the sixth user 301F participates in a fully immersive experience using the sixth computing device 106F. Additionally, the seventh computing device 106G may join the teleconference session 104 in the companion mode of operation. Even further, the sixth user 301F may transfer functionality between each device such that the devices "swap" modes of operation from the primary mode to the secondary mode, and vice versa.

Figure 4:
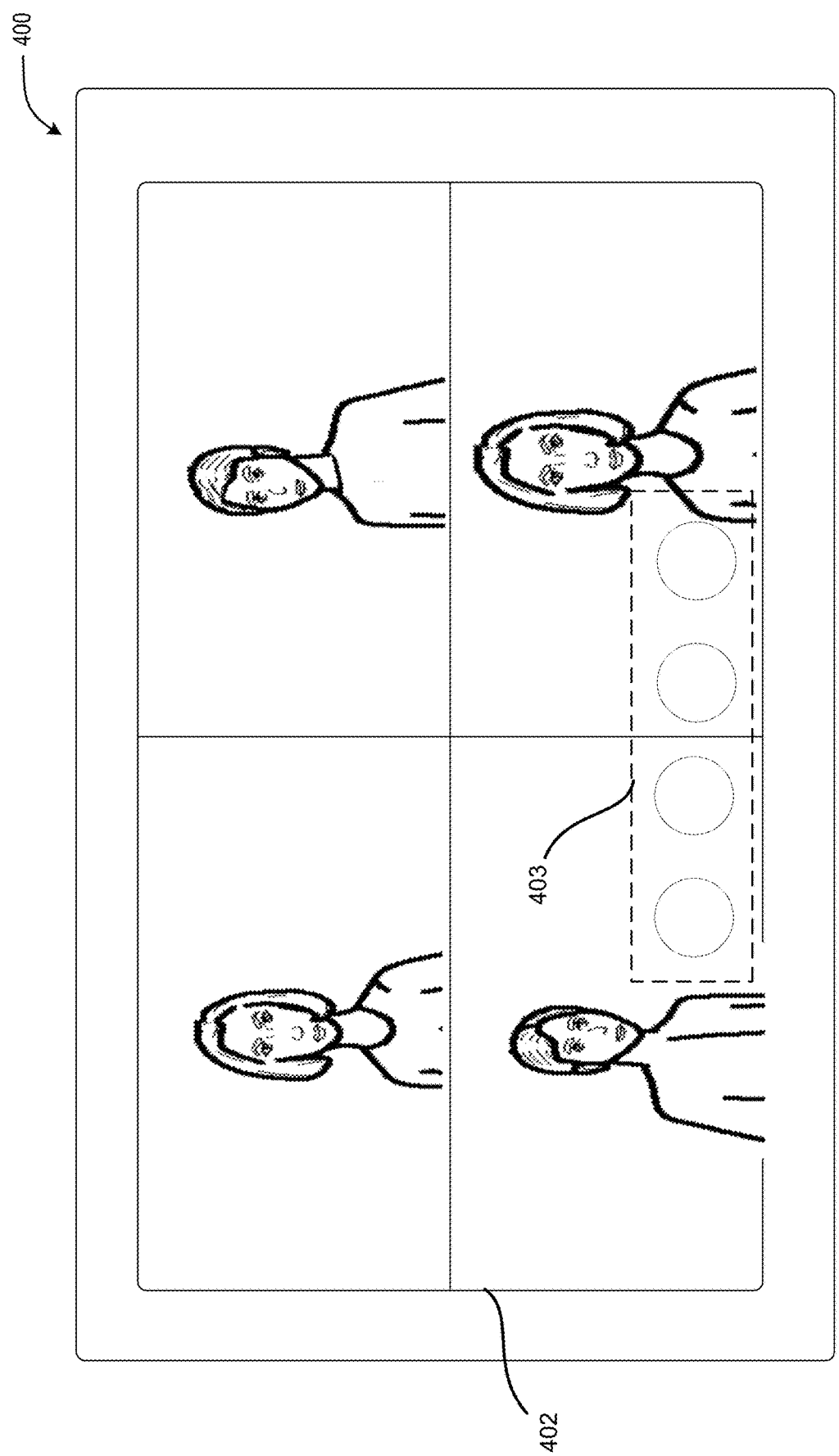
FIG. 4 illustrates an example user interface arrangement of a primary computing device.

As summarized above, the techniques disclosed herein provide different modes of operation for teleconference sessions. Additionally, user interfaces and user interface arrangements for enabling users to access and share relevant information based on the primary and companion modes of operation can be provided to further enhance the teleconference system 102. Several examples of such user interfaces are shown in FIGS. 4, 5A through 5B, and 6A through 6C. Specifically, FIG. 4 illustrates aspects of a first user interface 400 that can be displayed on a device 106 in communication with a telecommunication session 104. This example user interface 400 can be displayed on a device 106, such as a desktop computer, that is operating in the primary mode of operation.

As shown in FIG. 4, the first user interface 400 includes a primary portion 402 which provides a stage for the teleconference session 104. Selected media data, such as streaming videos, files, and applications, shared in the teleconference session 104 can be displayed in the primary portion 402 of the user interface. As illustrated, the primary portion 402 can display a variety of participant streams and/or content streams 142 from the teleconference session 104. Accordingly, the primary portion 402 displays a rendering of the first teleconference data described above. The first teleconference data 146(1) can generally include a first selection of teleconference data as compared to a reduced sub-portion of data being communicated to companion devices.

The first user interface 400 can also comprise a number of core teleconference control elements 403, which can be configured to control aspects of the teleconference session 104. Generally, the core teleconference control elements 403 are configured to control a state of the teleconference session 104. For instance, a first button of the core teleconference control elements 403 can disconnect a device 106 from the teleconference session 104. A second button of the core teleconference control elements 403 can control the microphone of the device 106, i.e., a mute button. A third button of the core teleconference control elements 403 can control the camera of the device 106, i.e., toggle the camera on or off. A fourth button or any positioned control element can also involve a transfer function. In response to receiving the user actuation of the fourth button, the primary device may transition to become a secondary device. In some configurations, the display of the core teleconference control elements 403 can fade over a predetermined period of time. In such configurations, the core teleconference control elements 403 can be redisplayed based on one or more actions, such as a hover or another suitable user interaction within a predetermined portion of the user interface 400.

When a device 106 connects to a teleconference session as a primary device, e.g., while being a single device or a primary device amongst devices associated with a single user identity, a menu having an arrangement of selectable elements providing access to various types of media can be displayed. The media can include, but is not limited to a desktop share, an application share, or a file share. The user interface 400 can be configured to allow the user to scroll through additional selectable elements by swiping or scrolling the selectable elements to the left or to the right. In addition, the display of the selectable elements can be expanded when a user provides a gesture, such as an upward swipe. Thus, there are various user interface arrangements for primary devices allowing for fully immersive control of a teleconference session.

Figure 5A:
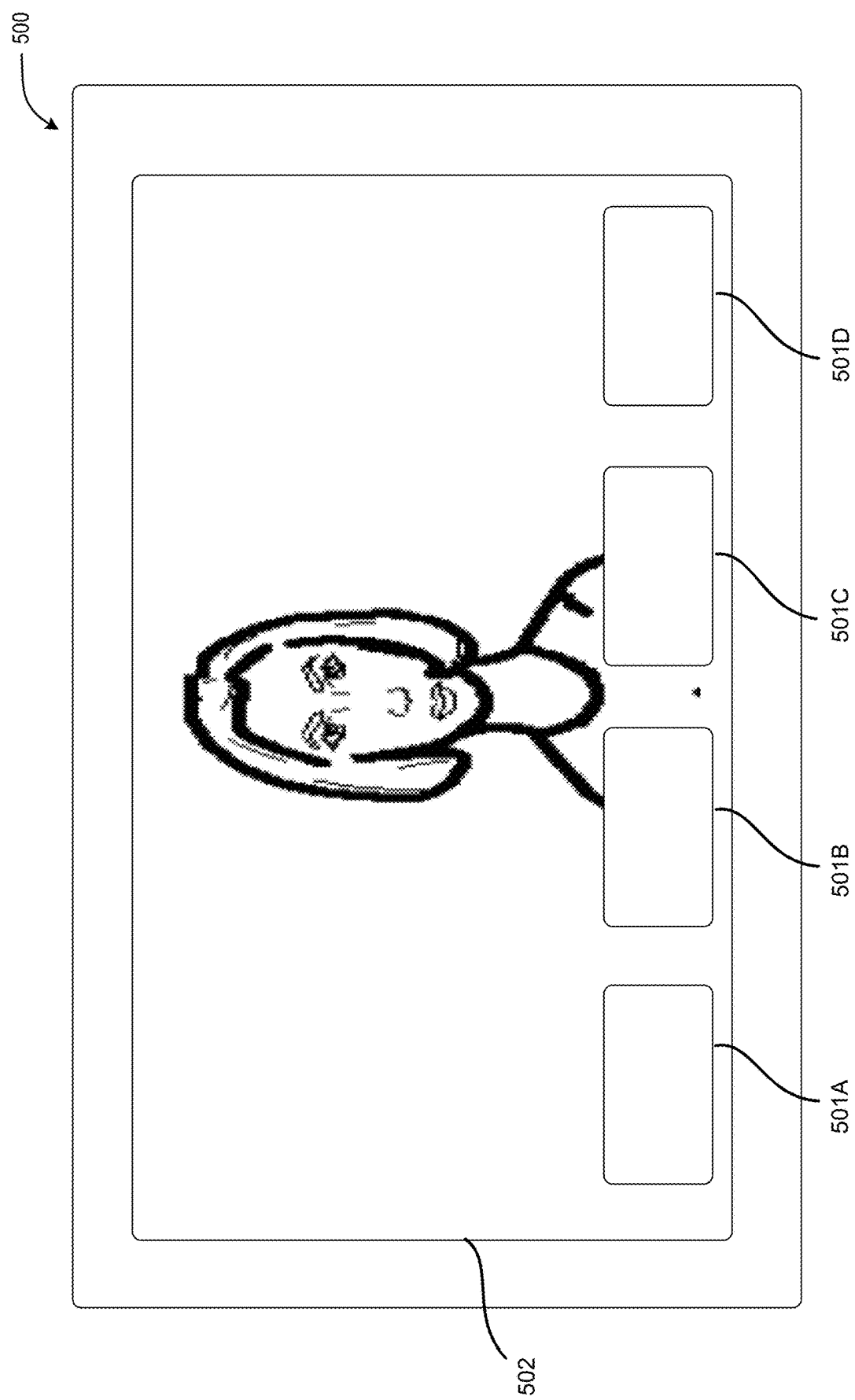
FIGS. 5A-5B illustrate several example user interface arrangements of a companion computing device.
Figure 5B:
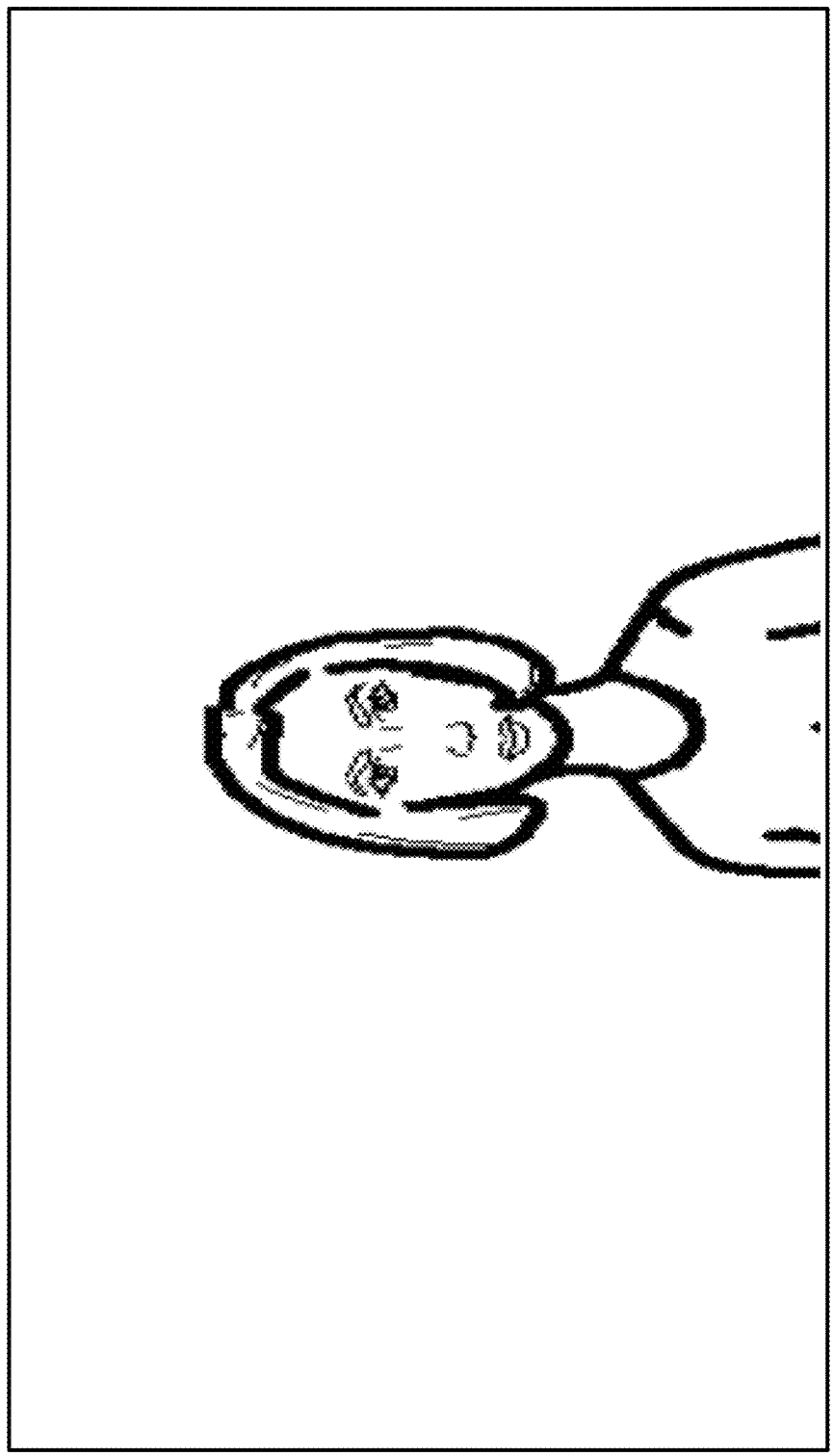

Turning now to FIGS. 5A-5B, several graphical user interfaces associated with companion devices in the companion mode of operation are described in detail. FIG. 5A shows aspects of a companion user interface 500 for a companion device. Generally, the user interface 500 includes a reduced user interface configured to display the sub-portion of teleconference data 146 based at least in part on an activity level. The example of FIG. 5A shows a control menu having sharing control elements 501 for displaying options for sharing media and/or options for promoting a companion device to a primary device. Furthermore, the interface 500 includes a session stage 502 somewhat similar to the session stage 402 described above.

For instance, a first control 501A is configured to activate a camera device. In response to receiving a user actuation of the first control 501A, the camera of the device is activated and a live video feed from the camera may be presented "on stage" (e.g., if allowed by a primary device), and a rendering of the live feed is displayed on other devices in communication with the teleconference session 104. The second control 501B is configured to activate file sharing and application sharing functionality. In response to receiving a user actuation of the second control 501B the secondary device enables a user to select an application or a file to be shared with the teleconference session 104. Once a file or an application is selected, a rendering of the selected media can be presented "on stage," e.g., a rendering of the selected media is communicated to devices in communication with the teleconference session 104.

The third control 501C is configured to activate a transfer function. In response to receiving a user actuation of the third control 501C, the companion device may become a primary device based on considerations of the teleconference system 102. For example, if a device 106 is associated with a particular user identity, the user actuation of the third control 501C is received, and there is no longer a primary device associated with the user identity, the teleconference system 102 may enable the device to switch to the primary mode of operation to retain the immersive experience for the user. The transfer to the primary mode may also be facilitated by demoting an existing primary device associated with the user identity to the companion mode of operation to allow the initial companion device to become a user's primary device. Thus, several implementations of a swap from companion mode to primary mode can be facilitated by the techniques described herein.

The fourth control 501D provides a connection control to the teleconference session 104, e.g., the fourth control 501D can be a "hang up" or disconnect button. These examples are provided for illustrative purposes and are not to be construed as limiting. It can be appreciated that other controls can be displayed providing additional functionality to a companion device.

As shown, the interface 500 does not have core teleconference control elements for controlling a microphone or other forms of audio communication as a companion device is not configured to communicate audio signals in some implementations. Additionally, as shown in FIG. 5B, other variations on the interface 500 including a lack or hidden set of companion control elements is also applicable.

The contextual menu controls, features, searchable content, recent or contextual content can be the open state of many differing conversation and collaboration core control needs such as: sharing, recording, remote control, pstn/voip calling, sensor detection, device detection/selection, etc. The layout configuration of the control menu can adapt to differing screen layouts as well: top, bottom, side, etc. Actionability can be influenced by differing gestures as well: swipe up, down, left, right, and tap, double tap, tap and hold, etc.

In some configurations, a companion device can select different types of media data for display. For instance, a companion device can display received teleconference data that is based on an activity level. In one illustrative example, as shown in the example of FIG. 5B, if a main view of a primary device is displaying a participant stream, the participant stream may be displayed on companion devices on the main portion 502 of the user interface 500. It follows that as different content streams or participant streams are displayed on a primary device, only a subset of teleconference data is communicated to the companion devices. Accordingly, reduced bandwidth usage is realized while also allowing a fully immersive teleconference experience.

Figure 6A:
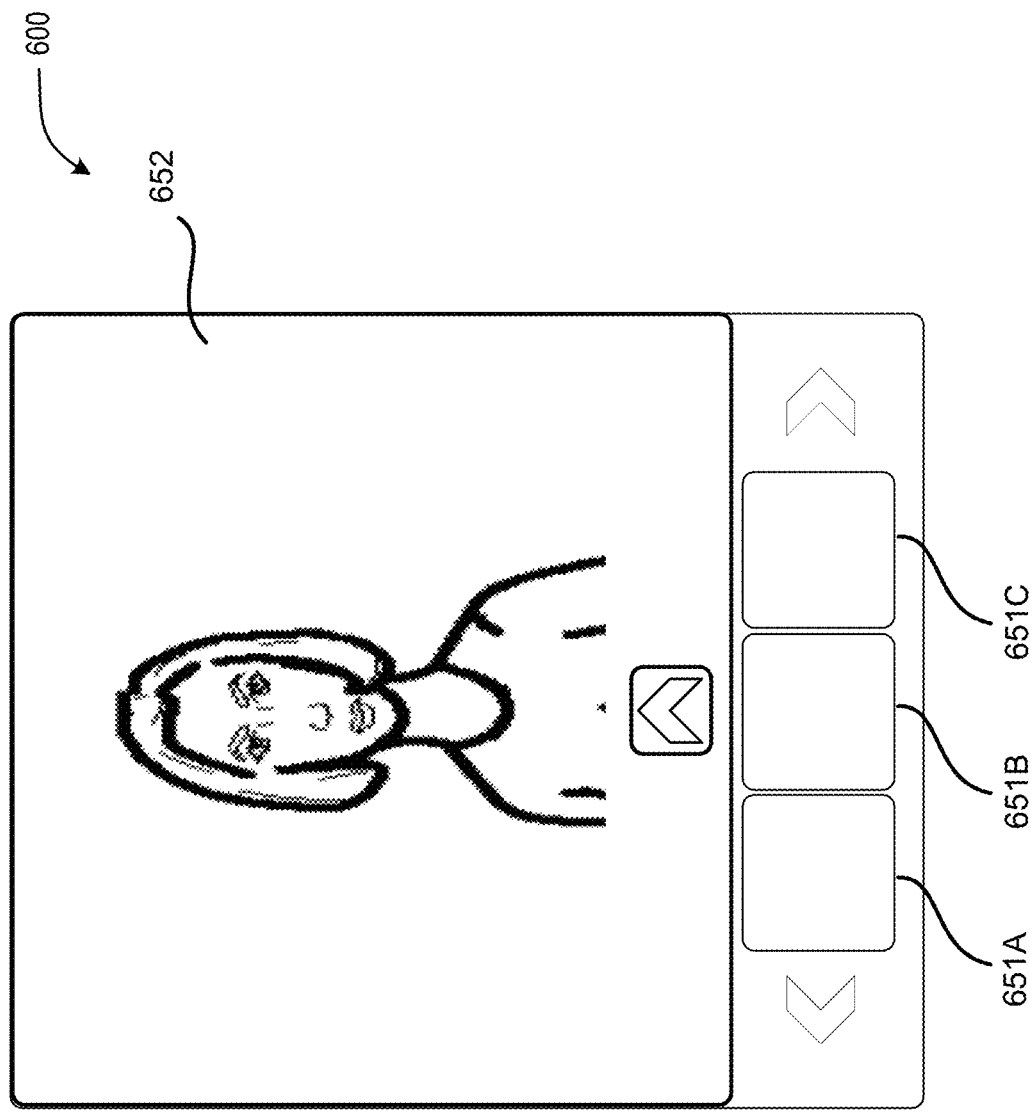
FIGS. 6A-6C illustrate several example user interface arrangements of different forms of companion computing devices.

Turning now to FIG. 6A, aspects of another user interface, interface 600, used for a device 106 operating in a companion mode of operation are described. In this particular example, it is understood that the particular interface 600 is an illustrative example representing a user interface on a mobile device, such as a tablet computer, mobile phone, or other similar device. It can be appreciated that similar aspects of the interface 600 as compared to the interface 500 exist. Accordingly, exhaustive description of similar elements is omitted herein for the sake of brevity.

As shown, the user interface 600 can comprise a control menu having sharing control elements 651 for providing access to various types of media. The sharing control elements 651 can be arranged to function similar to the sharing control elements 501 described in detail above. For instance, the first selectable element 651A can provide access to a particular file. The second selectable element 651B can provide access to a desktop share, and the third selectable element 651C can provide access to an application share. These examples are provided for illustrative purposes and are not to be construed as limiting. It can be appreciated that the selectable elements 651 can provide access to any suitable type of shareable media and are arranged similarly to the selectable elements 501.

As shown in FIG. 6A, the interface 600 can also include a display of the session stage 652, which is a video presentation of the second teleconference data or sub-portion of teleconference data communicated to the client devices. The display of the session stage 652 can show a salient feature of the session, such as the most dominant speaker or shared content. Upon a user actuation of a graphical element, such as the chevron displayed in the bottom center of the interface, the display of the session stage 652 can expand to show additional sharing options available to companion devices. For example, as shown in FIG. 6B and FIG. 6C, examples of full swipe configurations of a user interface 600 of a mobile device operating in the companion mode are provided.

Figure 6B:
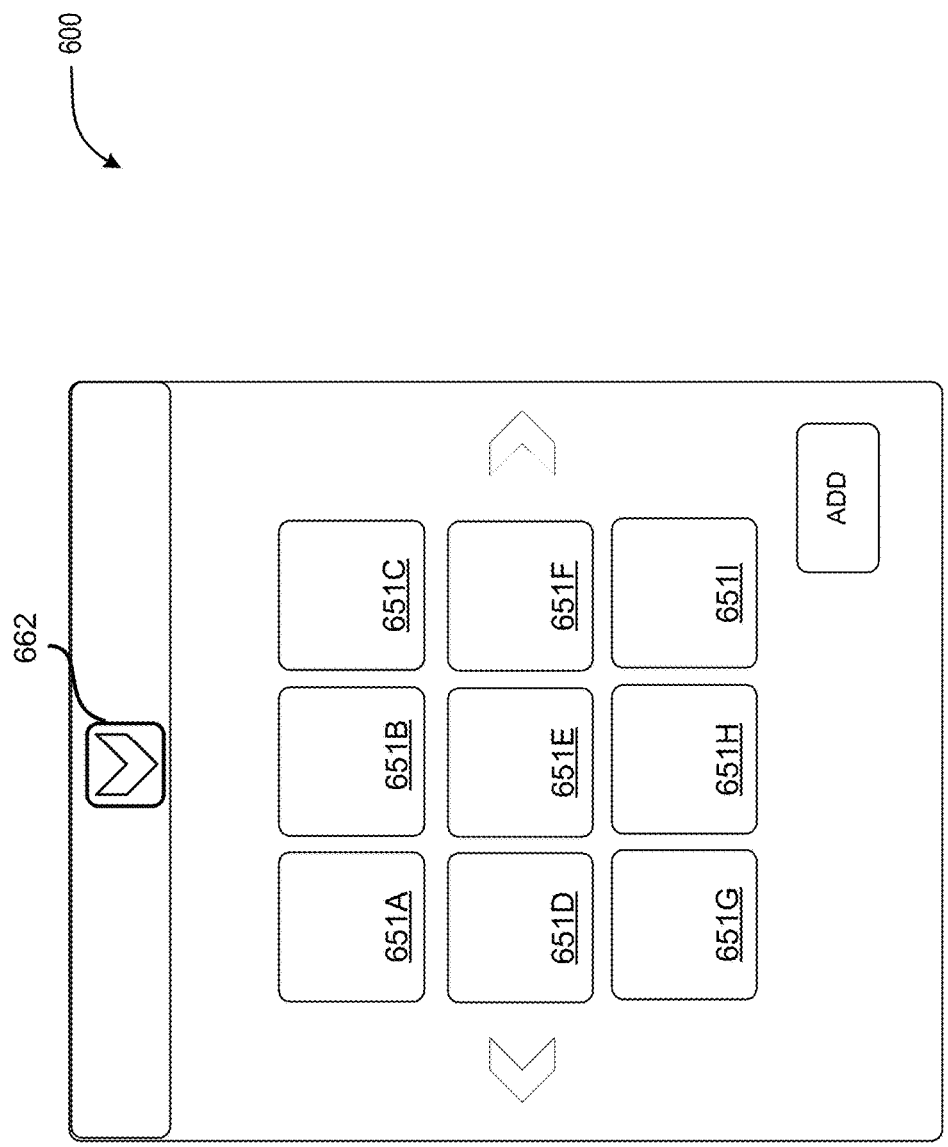
Figure 6C:
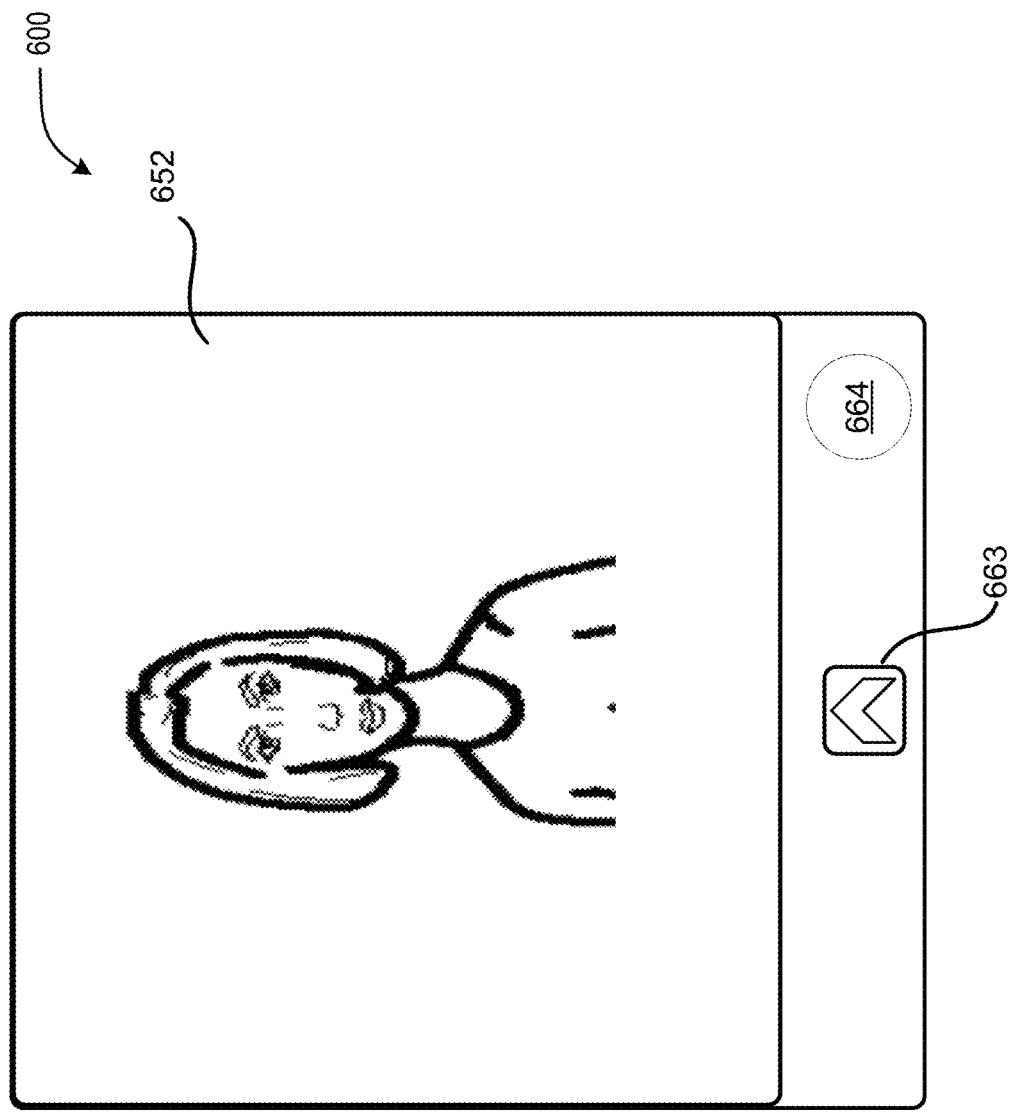

As shown in FIG. 6B, the user interface 600 can comprise a control menu having sharing control elements 651A-651I for providing access to various types of media. For instance, the selectable elements 651A-651I can provide access to a particular file, a desktop share, and an application. These examples are provided for illustrative purposes and are not to be construed as limiting. It can be appreciated that the selectable elements 651A-551I can provide access to any suitable type of shareable media. It can also be appreciated that the interface 600 can have any suitable number of selectable elements 651. In addition, a user can scroll through additional selectable elements 651A-651I by actuating the arrows to view additional selectable elements 651. The user interface 600 can also include an "ADD" button for enabling users to add content, e.g., files, applications and other content, to the menu. Displayed controls and content can scale in rows and column behaviors to adapt to differing size devices, windows, user needs, etc.

The user interface 600 can also provide access to a display of the session stage by the use of a gesture, such as a down swipe applied to the first UI element 662. When a predetermined gesture is received, e.g., a down swipe is applied to the first UI element 662, the user interface 600 transitions to the example user interface 600 shown in FIG. 6C, which includes a video presentation of the second teleconference data 146(2) that is presented on the session stage 652. While in this mode, other share controls 664, e.g., a send button or a share button, can be positioned in the user interface 600. The user interface 600 can be configured with or without the share controls. The user interface 600 shown in FIG. 6C can transition back to the user interface 600 shown in FIG. 6B in response to receiving a predetermined input gesture, such as an up swipe at the second UI element 663.

Although some devices have been described as "secondary" or "companion" devices, it should be understood that some features of the companion devices can be leveraged to allow additional interaction and shareable content, much like an extension of a primary device. For example, as illustrated in FIGS. 7A-7D, companion devices may implement a shared camera or "roving camera" functionality to allow a meeting participant to offer a real-world view of content and a surrounding environment while not disturbing an associated primary device. In this example, a companion device 106D comprises a camera 781 suitable for streaming video data to the teleconference session 104. As the user directs the camera (referred to herein as a "roving camera") of the device 106D to content 780, the device 106D generates a video stream or photo that is communicated to the server module 136 for distribution of the content. The shared content can include a video stream or still images.

Figure 7A:
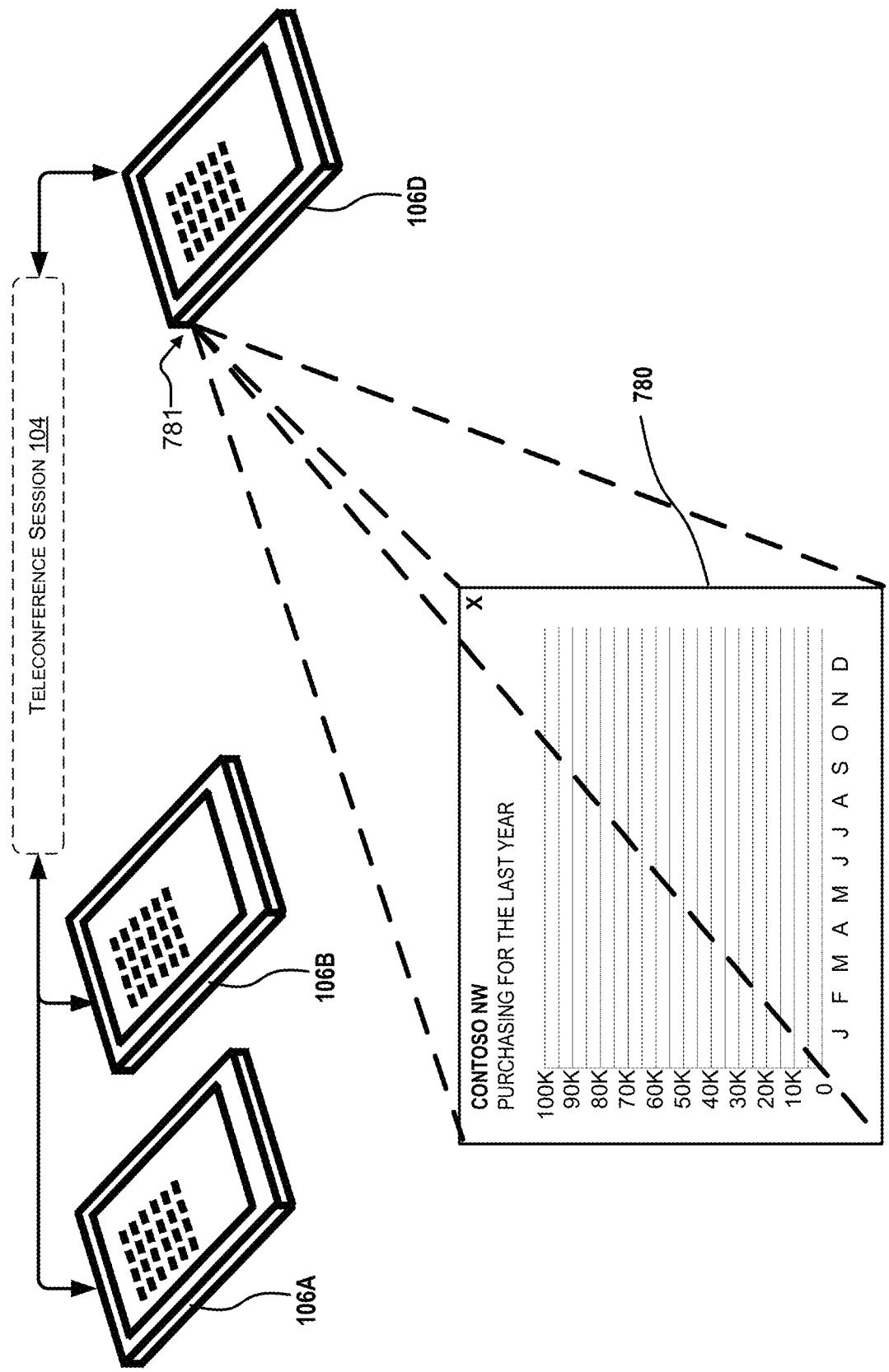
FIGS. 7A-7D illustrate several example user interface arrangements with shared content using a roving camera view of a companion computing device.

With reference to the example of FIG. 3, FIG. 7A shows the fourth computing device 106D operating in the companion mode of operation and generating image data via the camera 781. The image data is shared with devices of the teleconference session 104, such as the first computing device 106A and the second computing device 106B. Any content can be shared, including a whiteboard, a drawing, a photograph, a book page, or any other content from an analog environment. Thus, in this example, the teleconference system 102 can receive a request to share video content from a camera 781 of the computing device 106D. Furthermore, the teleconference system 102 can add the video content to the teleconference data and the sub-portion of the teleconference data for sharing amongst the devices participating in the teleconference session 104.

Figure 7B:
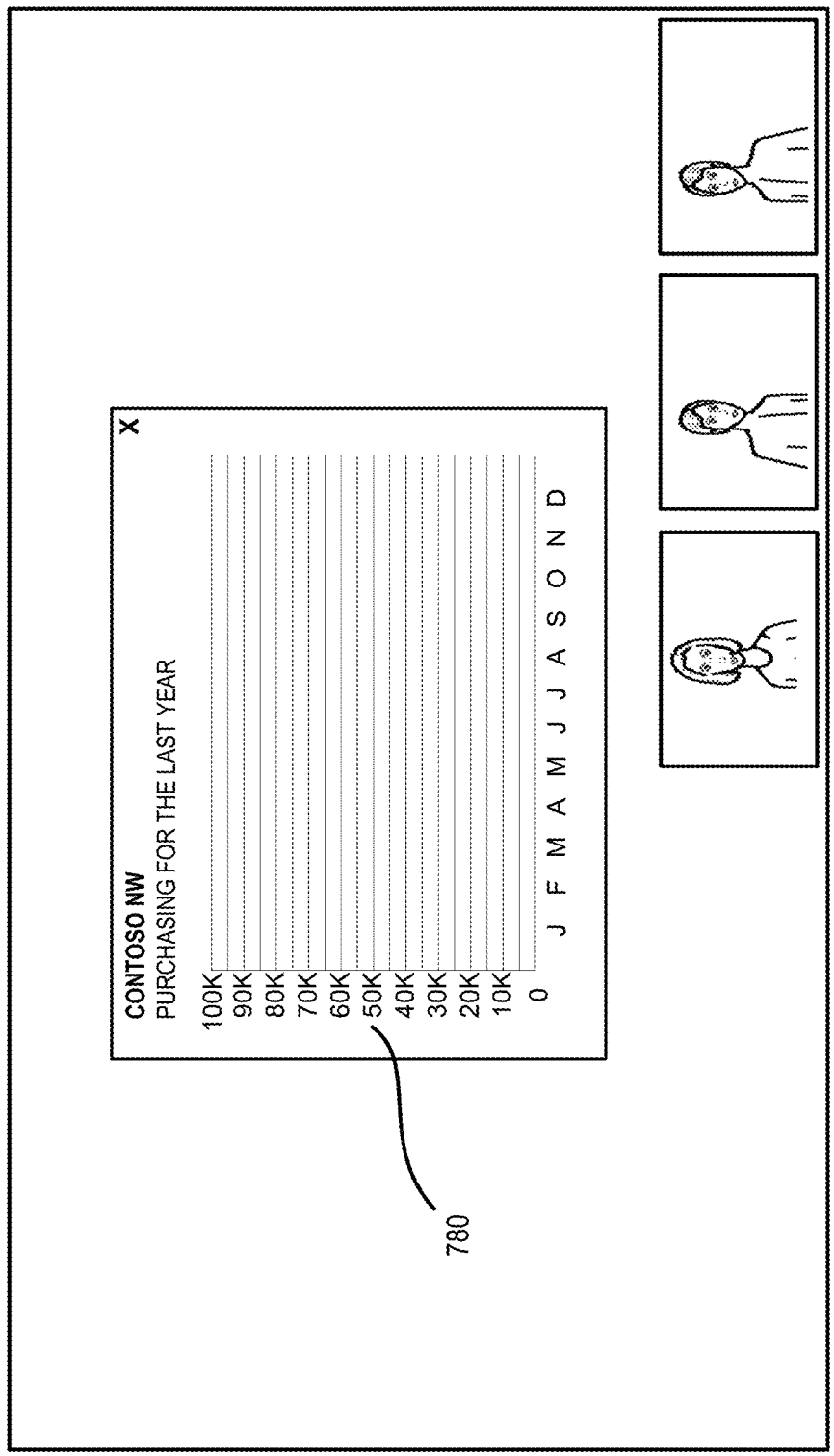
Figure 7C:
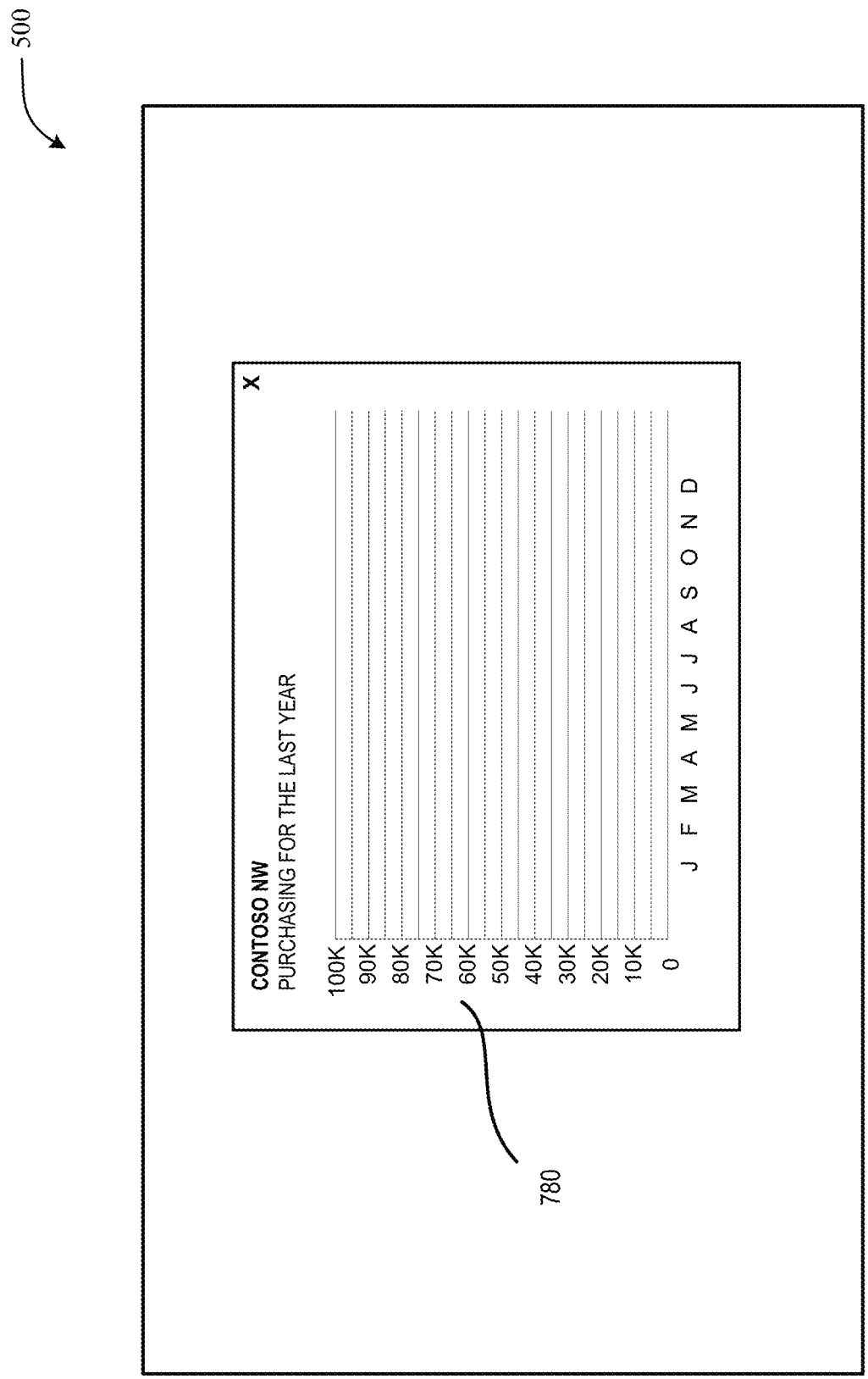
Figure 7D:
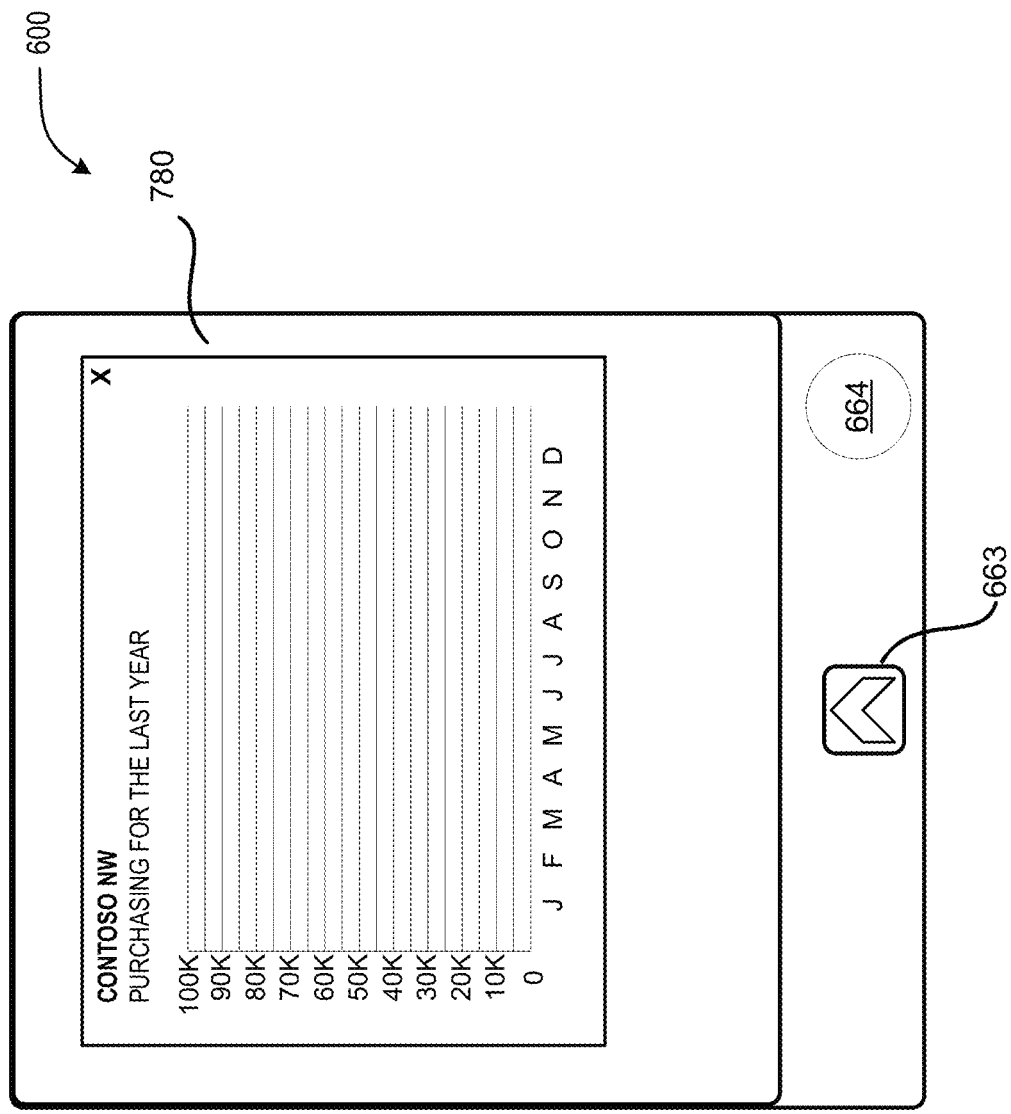

Following this example, any user in an online meeting, e.g., a teleconference session 104, can send live video or a still image to a shared video stage that treats roving camera video as a content stream rather than as a traditional egocentric participant stream (aka 'talking head' video). This feature might be triggered by a user using a companion device to share real-world content or other content with meeting participants. As shown in FIG. 7B, the content 780 can be displayed at any primary device, such as primary device 106E using an overlay view. Other views, such as persistent views, can also be applicable. Other devices associated with the teleconference session 104 may also receive and display the content 780, as shown in FIGS. 7C and 7D. Accordingly, while a companion device can be used to receive second teleconference data 146(2) or a sub-portion of teleconference data 146, a companion device can also be used to augment teleconference sessions.

As described in detail above, real-time mediated collaboration, such as via an online meeting, videoconference, or a document collaboration system is typically accomplished using a single device per user ID. In current collaboration systems, if multiple devices are simultaneously joining and associated with a single user identity, it is possible the user experience is essentially duplicated across devices, and several inefficiencies including over utilization of bandwidth and use of multiple audio devices per user identity are apparent. This may have deleterious results for the user experience. At best in such a case audio feedback may be presented through "echoes" and "ghosting" of an audio stream. At worst this causes technical and practical problems, including but not limited to race conditions for synchronizations, notifications, control execution, audio echo and howl, battery drain, and extra bandwidth usage. This invention concerns the addition of second and third, up to an n number of devices associated with a single user identity which can be automatically differentiated upon join so as to augment the primary device experience rather than duplicate it. The invention distinguishes the states of any primary device in a real-time collaboration session from the states of any companion devices that join the same session while associated with a single user identity.

Figure 8:
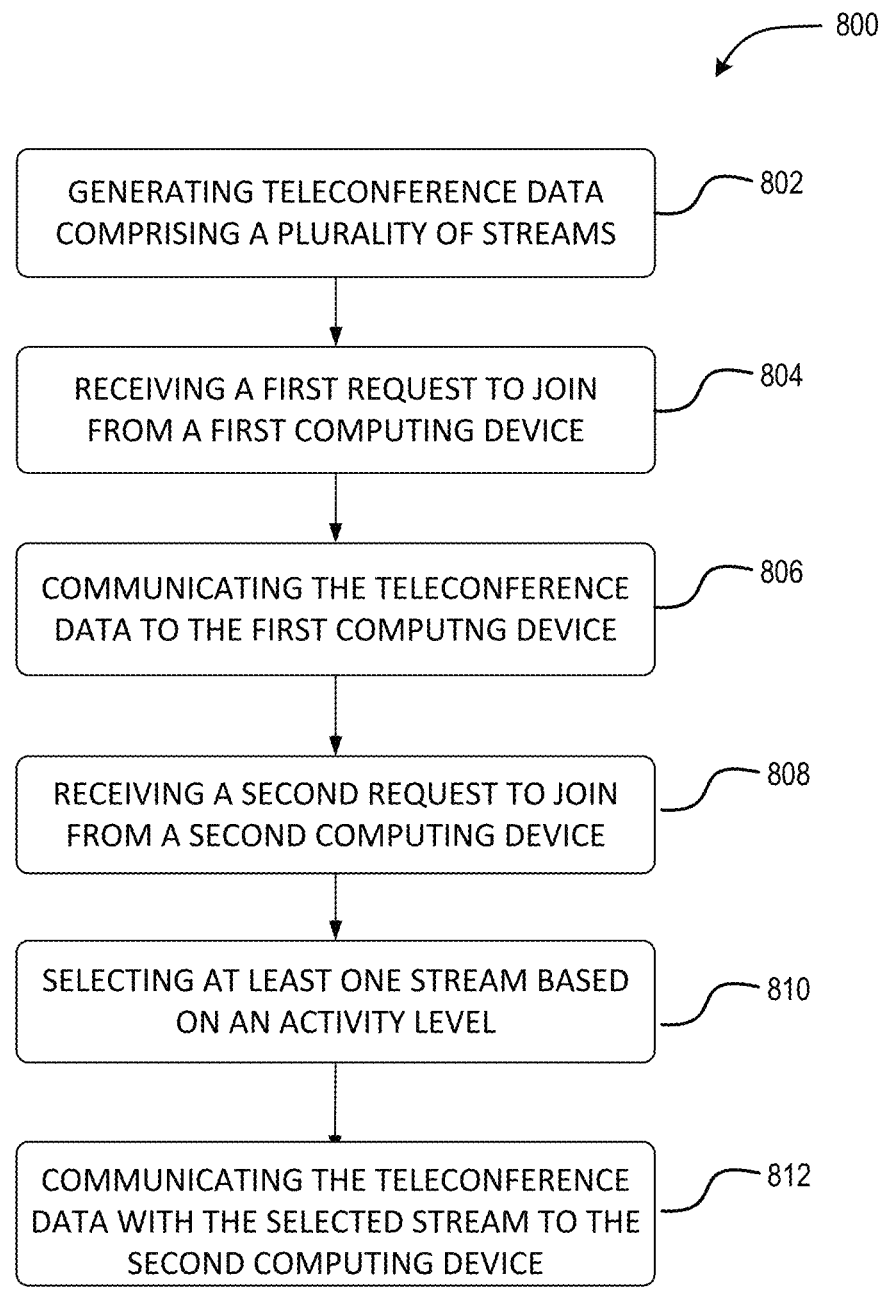
FIG. 8 is a flowchart of an example method of facilitating companion devices for real-time collaboration in teleconference sessions.

Hereinafter, a more detailed description of operations of the teleconference system 102 is provided with reference to FIG. 8, which illustrates a flowchart of an example method 800 of providing companion devices for real-time collaboration in teleconference sessions.

The method 800 may include generating teleconference data 146 comprising a plurality of streams 142 associated with a teleconference session 104, at block 802. For example, the plurality of streams 142 may be received from a plurality of computing devices 106 associated with the teleconference session 104.

The method 800 may further include receiving a first request to join the teleconference session 104 from a first computing device (e.g., the third computing device 106C of FIG. 3A) associated with a first user identity (e.g., the third user 301C of FIG. 3A), at block 804. Generally, the request may be substantially similar to the access request, configure command, and/or reconfigure commands described in detail above with reference to FIG. 1 (e.g., CTL 156(1)).

The method 800 may further include communicating the teleconference data 146 to the first computing device 106C causing the first computing device (e.g., computing device 106C) to display a primary user interface 400, at block 806. The primary user interface 400 can include a rendering of the plurality of streams 142. For example, as shown in FIG. 3B and FIG. 4, the user interface 400 can be arranged to display multiple streams or a single stream, as well. Additionally, the user interface 400 can comprise a plurality of core teleconference control elements 403. The core teleconference control elements 403 can include user interface elements configured to control a state of the first computing device (e.g., device 106C) and a state of the teleconference session 104.

Thereafter, or at substantially the same time as, the receipt of the first request, the method 800 includes receiving a second request to join the teleconference session 104 from a second computing device (e.g., device 106D) associated with the first user identity (e.g., user 301C), at block 808. For example, the user 301C may attempt to join the teleconference session 104 from the device 106C and the device 106D at substantially the same time. Additionally, the user (e.g., user 301C) may attempt to first join the teleconference session 104 with the device 106C. Subsequently, the user 301C may attempt to join the teleconference session 104 with a companion device 106D.

Responsive to the second request, the method 800 may include selecting at least one stream of the plurality of streams 142 based on an activity level, at block 810. In general, in configuring or generating the teleconference data 146, the first teleconference data 146(1), and/or the second teleconference data 146(2) through 146(N), the sub-portion of teleconference data or the second teleconference data 146(2) through 146(N) can be selected based on an activity level for data presented by participants of the teleconference session 104. The video or shared content in the media data for each participant may be analyzed to determine an activity level for any stream 142(1) through 142(M) received at the teleconference system 102. The activity level can be based on any type of activity including, but not limited to, any combination of the following:

1. participant motion—the extent to which a participant moves in a video may determine the participant's activity level. Participants in the process of gesturing or otherwise moving in the video may be deemed to be participating at a relatively high level in the teleconference.
2. participant lip motion—the video may be analyzed to determine the extent to which a participant's lips move as an indication of the extent to which the participant is speaking. Participants speaking at a relatively high level may be deemed to be participating at a corresponding relatively high level.
3. participant facial expressions—the participant's video may be analyzed to determine changes in facial expressions, or to determine specific facial expressions using pattern recognition. Participants reacting through facial expressions in the teleconference may be deemed to be participating at a relatively high level.
4. content modification—video of content being shared in the teleconference may be analyzed to determine if it is being modified. Thus, recently or actively modified content may have a high activity level.
5. content page turning—video of content being shared may be analyzed to determine if there is page turning of a document, for example, and assigned a corresponding activity level.
6. number of participants having content in a display area—video of content being shared may be assigned an activity level based on the number of participants that have a view of the content in a display area.
7. participant entering teleconference session—media data from participants entering a teleconference may be assigned a high activity level. This value can be based on the order in which participants join a session.
8. participant leaving teleconference session—media data from participants leaving a teleconference may be assigned a low activity level.

Thus, participant streams and/or content streams having a relatively high activity level can be chosen for display in any of the companion user interface arrangements described above via communication of second teleconference data 146(2) through 146(N) or a sub-portion of the teleconference data 146 having the relatively high activity level. It is also understood that activity levels can be superseded based on other logic, for example, if a user having multiple devices desires a fixed view for companion computing devices, or other scenarios.

Upon selection of at least one stream, the method 800 further includes communicating the teleconference data 146 to the second computing device 106D causing the second computing device 106D to display a companion user interface 500, at block 812. The companion user interface 500 can include a rendering of the at least one stream. It is understood that the companion user interface 500 can include renderings of multiple streams, content streams, participant streams, or any combination thereof. Additionally, the companion user interface 500 can comprise a plurality of companion teleconference control elements 501. The companion teleconference control elements 501 can include user interface elements configured to provide content sharing functionality. Generally, the content sharing functionality enables the second computing device 106D to share at least one of a selected file, a desktop view, or a stream generated by a camera 781 of the second computing device 106D.

According to other examples implementing the method 800, the plurality of streams 142 can also comprise at least one participant stream and at least one content stream, as described above. Therefore, in a scenario where participant streams and content streams are processed by the teleconference system 102, the teleconference system 102 can also communicate the at least one participant stream and the at least one content stream to the first computing device 106C and communicate the at least one content stream to the second computing device 106D. In this manner, reduced usage of bandwidth can be realized through intelligent selection of streams 142 to communicate to primary and companion devices.

Although described generally as related to the teleconference system 102, it should be readily understood that individual devices under user control also implement one or more aspects described above. For example, a user 301C can also request to join the teleconference session 104 using multiple devices. In this regard, the user 301C can transmit a first request 156 to join a teleconference session 104 from a first computing device 106C associated with a first user identity 301C. Responsive to the request 156, the first computing device 106C can receive first teleconference data 146(1) comprising a plurality of streams 142 associated with the teleconference session 104 and display a rendering of the plurality of streams 142.

Similarly, the user 301C can transmit a second request to join the teleconference session 104 from a second computing device 106D associated with the first user identity 301C. Responsive to the second request, the second computing device 106D can receive second teleconference data 146(2) comprising a subset of streams of the plurality of streams 142 and display a rendering of the subset of streams of the plurality of streams 142. The subset of streams of the plurality of streams 142 is based at least in part on data indicating an activity level associated with the subset of streams 142, as described in detail above.

Thus, several aspects of this disclosure can be implemented by the teleconference system 102 and individual computing devices 106. Additionally, once connected to the teleconference session 104, the user 301C can transmit several commands using the user interface elements illustrated in FIG. 4 and FIG. 5A. For example, the user 301C can transmit one or more core teleconference control requests from the first computing device 106C to control the state of the teleconference session 104. Similarly, the user 301C can transmit one or more companion teleconference control requests from the second computing device 106D to control content sharing functionality of the second computing device 106D. Other forms of requests and controls including the "swap" functionality described above are also applicable.

As described herein in detail, several aspects of enhancing teleconference sessions by facilitating multiple devices for users have been provided. Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

CLAUSES

The many features, aspects, and/or details explained above can be represented in one or more clauses as defined below:

Clause 1: A method, comprising generating teleconference data (146) comprising a plurality of streams (142) associated with a teleconference session (104); receiving a first request to join the teleconference session (104) from a first computing device (106C) associated with a first user identity (301C); communicating the teleconference data (146) to the first computing device (106C) causing the first computing device (106C) to display a primary user interface (400), the primary user interface (400) including a rendering of the plurality of streams (142); receiving a second request to join the teleconference session (104) from a second computing device (106D) associated with the first user identity (301C); selecting at least one stream of the plurality of streams (142) based on an activity level; and communicating the teleconference data (146) to the second computing device (106D) causing the second computing device (106D) to display a companion user interface (500), the companion user interface (500) including a rendering of the at least one stream.

Clause 2: A method as in clause 1, wherein the primary user interface comprises a plurality of core teleconference control elements, the core teleconference control elements including user interface elements configured to control a state of the first computing device and a state of the teleconference session.

Clause 3: A method as in any of the clauses above, wherein the companion user interface comprises a plurality of companion teleconference control elements, the companion teleconference control elements including user interface elements configured to provide content sharing functionality, wherein the content sharing functionality enables the second computing device to share at least one of a selected file, a desktop view, or a stream generated by a camera of the second computing device.

Clause 4: A method as in any of the clauses above, wherein the activity level is representative of a level of activity of the at least one stream.

Clause 5: A method as in any of the clauses above, wherein the plurality of streams comprise at least one participant stream and at least one content stream, wherein the method further comprises: communicating the at least one participant stream and the at least one content stream to the first computing device; and communicating the at least one content stream to the second computing device.

Clause 6: A method as in any of the clauses above, wherein the at least one participant stream comprises a user media data of the teleconference session and the at least one content stream comprises content media data of the teleconference session.

Clause 7: A method comprising: transmitting a first request to join a teleconference session (104) from a first computing device (106C) associated with a first user identity (301C); receiving first teleconference data (146(1)) comprising plurality of streams (142) associated with the teleconference session (104) at the first computing device (106C); displaying a rendering of the plurality of streams (142) on the first computing device (106C); transmitting a second request to join the teleconference session (104) from a second computing device (106D) associated with the first user identity (301C); receiving second teleconference data comprising a subset of streams (142) of the plurality of streams (142) at the second computing device (106D); and displaying a rendering of the subset of streams (142) of the plurality of streams (142) on the second computing device (106D), wherein the subset of streams (142) of the plurality of streams (142) is based at least in part on data indicating an activity level associated with the subset of streams (142).

Clause 8: A method as in any of the clauses above, wherein the method further comprises: transmitting one or more core teleconference control requests from the first computing device to control the state of the teleconference session.

Clause 9: A method as in any of the clauses above, wherein the method further comprises: transmitting one or more companion teleconference control requests from the second computing device to control content sharing functionality of the second computing device.

Clause 10: A method as in any of the clauses above, wherein the plurality of streams comprise a plurality of participant streams and a plurality of content streams, wherein the plurality of participant streams comprise a user media data of the teleconference session and the plurality of content streams comprise content media data of the teleconference session.

Clause 11: A method, comprising: generating teleconference data (146) comprising plurality of streams (142) associated with a teleconference session (104); receiving a first request to join the teleconference session (104) from a first computing device (106C) associated with a first user identity (301C); receiving a second request to join the teleconference session (104) from a second computing device (106D) associated with the first user identity (301C); communicating the teleconference data (146) to the first computing device (106C); and communicating a sub-portion of the teleconference data (146(2)) to the second computing device (106D), wherein the sub-portion (146(2)) comprises at least one stream that is selected from the plurality of streams (142) based on an activity level.

Clause 12: A method as in any of the clauses above, wherein the method further comprises: receiving a control command for causing a transition of the first computing device and the second computing device; and in response to receiving the control command, communicating the teleconference data to the second computing device for displaying a rendering of the plurality of streams; and communicating the sub-portion of the teleconference data to the first computing device for displaying a rendering of the at least one stream.

Clause 13: A method as in any of the clauses above, wherein the method further comprises: receiving a reconfiguring command for causing a transition to the first computing device; and in response to receiving the reconfiguring command, discontinuing communicating the sub-portion of the teleconference data to the second computing device.

Clause 14: A method as in any of the clauses above, wherein the method further comprises: disabling a camera component of the second computing device.

Clause 15: A method as in any of the clauses above, wherein the method further comprises: disabling an audio component of the second computing device.

Clause 16: A method as in any of the clauses above, wherein the method further comprises: receiving a request to share video content from a camera of the second computing device; and adding the video content to the teleconference data and the sub-portion of the teleconference data.

Clause 17: A system comprising: one or more processing units (202); and a computer-readable medium (204) having encoded thereon computer-executable instructions to cause the one or more processing units (202) to generate teleconference data (146) comprising a plurality of streams (142) associated with a teleconference session (104); receive a first request to join the teleconference session (104) from a first computing device (106C) associated with a first user identity (301C); communicate the teleconference data (146) to the first computing device (106C) for displaying a primary user interface (400), the primary user interface (400) including a plurality of core teleconference control elements (403); receive a second request to join the teleconference session (104) from a second computing device (106D) associated with the first user identity (301C); select at least one stream (142) of the plurality of streams (142) based on an activity level; and communicate the teleconference data (146) to the second computing device (106D) causing the second computing device (106D) to display a companion user interface (500), the companion user interface (500) including a plurality of companion teleconference control elements (501).

Clause 18: A system as in clause 17, wherein the plurality of streams comprise at least one participant stream and at least one content stream, wherein the computer-executable instructions further cause the one or more processing units to communicate the at least one participant stream and the at least one content stream to the first computing device; and communicate the at least one content stream to the second computing device.

Clause 19: A system as in any of the clauses above, wherein the computer-executable instructions further cause the one or more processing units to receive a reconfiguring command for causing a transition to the first computing device; and in response to receiving the reconfiguring command, discontinue communicating the teleconference data to the second computing device.

Clause 20: A system as in any of the clauses above, wherein the computer-executable instructions further cause the one or more processing units to receive a control command for causing a transition of the first computing device and the second computing device; and in response to receiving the control command, communicate the teleconference data to the second computing device causing a rendering of the plurality of streams; and communicate the teleconference data to the first computing device causing a rendering of the at least one stream

What is claimed is:
1. A method, comprising:
generating communication data comprising a plurality of streams associated with a communication session;
receiving a first request to join the communication session from a first computing device associated with a user identity;
communicating the communication data to the first computing device causing the first computing device to display a primary user interface, the primary user interface including a rendering of the plurality of streams;

receiving a second request to join the communication session from a second computing device associated with the user identity;

in response to receiving the second request from the second computing device to join the communication session with the user identity associated with the first computing device concurrently joined with the communication session, selecting at least one stream of the plurality of streams based on an activity level of a participant depicted in the at least one stream; and in response to receiving the second request from the second computing device to join the communication session with the user identity associated with the first computing device concurrently joined with the communication session, communicating the communication data to the second computing device causing the second computing device to display a companion user interface, the companion user interface including a rendering of the at least one stream that is selected based on the activity level of the participant depicted in the at least one stream, wherein a layout of the companion user interface of a second application operating on the second computing device is different from a layout of the primary user interface of a first application operating on the first computing device using the same user identity as the second application operating on the second computing device.

2. The method of claim 1, wherein the primary user interface comprises a plurality of core communication control elements, the core communication control elements including user interface elements configured to control a state of the first computing device and a state of the communication session.

3. The method of claim 1, wherein the companion user interface comprises a plurality of companion communication control elements, the companion communication control elements including user interface elements configured to provide content sharing functionality, wherein the content sharing functionality enables the second computing device to share at least one of a selected file, a desktop view, or a stream generated by a camera of the second computing device.

4. The method of claim 1, wherein the at least one stream that is selected based on the activity level is displayed on the second computing device, and wherein the at least one stream that is selected based on the activity level is displayed concurrently with the rendering of the plurality of streams on the first computing device.

5. The method of claim 1, wherein the at least one stream that is selected based on the activity level brings focus to content of the at least one stream on the second computing device while the rendering of the plurality of streams is concurrently displayed on the first computing device.

6. The method of claim 1, wherein the activity level is based on the participant depicted in the at least one stream performing a predetermined action.

7. The method of claim 1, wherein the activity level is based on a number of people depicted with the participant depicted in the at least one stream.

8. The method of claim 1, wherein the activity level is based on at least one of a motion of the participant depicted in the at least one stream or a facial expression of the participant depicted in the at least one stream.

9. The method of claim 1, wherein the second computing device transitions from the primary user interface to the companion user interface in response to determining that the first computing device and the second computing device are in the communication session using the same user identity.

10. The method of claim 1, wherein the layout of the companion user interface is different from the layout of the primary user interface in response to determining that the first computing device and the second computing device are in the communication session using the same user identity.

11. A method, comprising:
generating communication data comprising a plurality of streams associated with a communication session;
receiving a first request to join the communication session from a first computing device associated with a user identity;
receiving a second request to join the communication session from a second computing device associated with the user identity;
communicating the communication data to the first computing device; and
in response to receiving the second request from the second computing device to join the communication session with the user identity associated with the first computing device concurrently joined with the communication session, communicating a sub-portion of the communication data to the second computing device, wherein the sub-portion comprises at least one stream that is selected from the plurality of streams based on an activity level of a participant depicted in the at least one stream, wherein the at least one stream is selected in response to the second request from the second computing device to join the communication session with the user identity associated with the first computing device that is concurrently joined with the communication session, wherein a layout of a user interface of a second application operating on the second computing device is different from a layout of the primary user interface of a first application operating on the first computing device using the same user identity as the second application operating on the second computing device.

12. A method, comprising:
transmitting a first request to join a communication session from a first computing device associated with a user identity;
receiving first communication data comprising a plurality of streams associated with the communication session at the first computing device;
displaying a rendering of the plurality of streams on the first computing device;
transmitting a second request to join the communication session from a second computing device associated with the user identity;
receiving second communication data comprising a subset of streams of the plurality of streams at the second computing device; and
in response to receiving the second request from the second computing device to join the communication session with the user identity associated with the first computing device concurrently joined with the communication session, displaying a rendering of the subset of streams of the plurality of streams on the second computing device, wherein the subset of streams of the plurality of streams is selected based at least in part on data indicating an activity level of a participant depicted in at least one stream of the subset of streams, wherein the subset of streams is selected in response to the second request from the second computing device to join the communication session with the user identity associated with the first computing device that is concurrently joined with the communication session, wherein a layout of a user interface of the second computing device is different from a layout of a user interface of the first computing device, wherein a layout of a companion user interface of a second application operating on the second computing device is different from a layout of a primary user interface of a first application operating on the first computing device using the same user identity as the second application operating on the second computing device.

13. The method of claim 12, wherein the plurality of streams comprise a plurality of participant streams and a plurality of content streams, wherein the plurality of participant streams comprise a user media data of the communication session and the plurality of content streams comprise content media data of the communication session.

14. The method of claim 12, wherein the layout of the user interface of the second computing device is different from the layout of the user interface of the first computing device in response to determining that the first computing device and the second computing device are in the communication session using the same user identity.

15. The method of claim 11, wherein the layout of the user interface of the second computing device is different from the layout of the user interface of the first computing device in response to determining that the first computing device and the second computing device are in the communication session using the same user identity.

16. The method of claim 11, wherein the method further comprises:
receiving a control command for causing a transition of the first computing device and the second computing device; and
in response to receiving the control command,
communicating the communication data to the second computing device for displaying a rendering of the plurality of streams; and
communicating the sub-portion of the communication data to the first computing device for displaying a rendering of the at least one stream.

17. A system comprising:
one or more processing units; and
a computer-readable medium having encoded thereon computer-executable instructions to cause the one or more processing units to
generate communication data comprising a plurality of streams associated with a communication session;
receive a first request to join the communication session from a first computing device associated with a user identity;
communicate the communication data to the first computing device for displaying a primary user interface, the primary user interface including a plurality of core communication control elements;
receive a second request to join the communication session from a second computing device associated with the user identity;
in response to receiving the second request from the second computing device to join the communication session with the user identity associated with the first computing device concurrently joined with the communication session, select at least one stream of the plurality of streams based on an activity level of a participant depicted in the at least one stream; and
in response to receiving the second request from the second computing device to join the communication session with the user identity associated with the first computing device concurrently joined with the communication session, communicate the communication data to the second computing device causing the second computing device to display a companion user interface, the companion user interface including a plurality of companion communication control elements and a rendering of the at least one stream of the plurality of streams that is selected based on the activity level of the participant depicted in the at least one stream, wherein a layout of the companion user interface of a second application operating on the second computing device is different from a layout of the primary user interface of a first application operating on the first computing device using the same user identity as the second application operating on the second computing device.

18. The system of claim 17, wherein the plurality of streams comprise at least one participant stream and at least one content stream, wherein the computer-executable instructions further cause the one or more processing units to
communicate the at least one participant stream and the at least one content stream to the first computing device; and
communicate the at least one content stream to the second computing device.

19. The system of claim 17, wherein the computer-executable instructions further cause the one or more processing units to
receive a control command for causing a transition of the first computing device and the second computing device; and
in response to receiving the control command,
communicate the communication data to the second computing device causing a rendering of the plurality of streams; and
communicate the communication data to the first computing device causing a rendering of the at least one stream.

20. The system of claim 17, wherein the layout of the companion user interface is different from the layout of the primary user interface in response to determining that the first computing device and the second computing device are in the communication session using the same user identity.

* * * * *